US009611369B2

(12) United States Patent
Sato et al.

(10) Patent No.: US 9,611,369 B2
(45) Date of Patent: Apr. 4, 2017

(54) IN-MOLD FOAM MOLDED BODY COMPRISING POLYPROPYLENE RESIN FOAM PARTICLES AND METHOD FOR PRODUCING SAME

(71) Applicant: KANEKA CORPORATION, Osaka-shi, Osaka (JP)

(72) Inventors: Keishi Sato, Settsu (JP); Toru Yoshida, Settsu (JP)

(73) Assignee: KANEKA CORPORATION, Osaka-Shi (JP)

( * ) Notice: Subject to any disclaimer, the term of this patent is extended or adjusted under 35 U.S.C. 154(b) by 166 days.

(21) Appl. No.: 14/384,617

(22) PCT Filed: Mar. 13, 2013

(86) PCT No.: PCT/JP2013/057073
§ 371 (c)(1),
(2) Date: Sep. 11, 2014

(87) PCT Pub. No.: WO2013/137344
PCT Pub. Date: Sep. 19, 2013

(65) Prior Publication Data
US 2015/0057387 A1 Feb. 26, 2015

(30) Foreign Application Priority Data
Mar. 14, 2012 (JP) ................. 2012-057139

(51) Int. Cl.
C08J 9/00 (2006.01)
B29C 44/44 (2006.01)
C08J 9/232 (2006.01)
C08J 9/18 (2006.01)
B29C 44/02 (2006.01)
B29K 23/00 (2006.01)
B29K 79/00 (2006.01)

(52) U.S. Cl.
CPC ............. *C08J 9/0028* (2013.01); *B29C 44/02* (2013.01); *B29C 44/445* (2013.01); *C08J 9/0023* (2013.01); *C08J 9/18* (2013.01); *C08J 9/232* (2013.01); *B29K 2023/12* (2013.01); *B29K 2079/00* (2013.01); *C08J 2323/12* (2013.01)

(58) Field of Classification Search
CPC ...... B29C 44/02; B29C 44/445; C08J 9/0023; C08J 9/0028; C08J 9/18; C08J 9/232; C08J 2323/12; B29K 2023/12; B29K 2079/00
See application file for complete search history.

(56) References Cited

U.S. PATENT DOCUMENTS

2004/0054042 A1 3/2004 Iwamoto et al.
2004/0106738 A1 6/2004 Machida et al.
2008/0039588 A1 2/2008 Shibata et al.
2009/0156700 A1 6/2009 Oikawa et al.
2009/0169895 A1 7/2009 Nohara et al.
2011/0147974 A1 6/2011 Nohara et al.
2011/0311742 A1* 12/2011 Kadowaki ............ B65D 85/808
428/35.2
2014/0138868 A1 5/2014 Nakayama

FOREIGN PATENT DOCUMENTS

| CN | 101061163 A | 10/2007 |
| EP | 2163574 A1 | 3/2010 |
| JP | 61-113632 * | 5/1984 |
| JP | 3-87245 A | 4/1991 |
| JP | 7-30489 A | 11/1995 |
| JP | 8-12798 A | 1/1996 |
| JP | 8-92408 A | 4/1996 |
| JP | 10-130421 A | 5/1998 |
| JP | 2000-7854 A | 1/2000 |
| JP | 2000-290421 A | 10/2000 |
| JP | 2000-296530 A | 10/2000 |
| JP | 2001-212840 A | 8/2001 |
| JP | 2002-146113 A | 5/2002 |
| JP | 2002-179812 A | 6/2002 |
| JP | 2003-231770 A | 8/2003 |
| JP | 2008-106150 A | 5/2008 |
| JP | 2009-173021 A | 8/2009 |
| JP | 2009-256470 A | 11/2009 |
| WO | WO 2009/001645 A1 | 12/2008 |
| WO | WO 2013/011951 A1 | 1/2013 |

OTHER PUBLICATIONS

International Preliminary Report on Patentability and an English translation of the Written Opinion of the International Searching Authority (Forms PCT/IB/338, PCT/IB/373, and PCT/ISA/237) for International Application No. PCT/JP2013/057073, dated Sep. 25, 2014.
International Search Report (Form PCT/ISA/210) for International Application No. PCT/JP2013/057073, dated Jun. 18, 2013.
European Patent Office communication and extended search report issued in the corresponding European Patent Application No. 13761965.6 on Sep. 16, 2015.
International Preliminary Report on Patentability and the Written Opinion of the International Searching Authority (Forms PCT/IB/338, PCT/IB/373, and PCT/ISA/237) dated Sep. 25, 2014, for International Application No. PCT/JP2013/057267.
International Search Report (Form PCT/ISA/210) dated Jun. 18, 2013, for International Application No. PCT/JP2013/057267 with the English translation.
Extended European Search Report dated Sep. 16, 2015, for European Application No. 13760551.5.
U.S. Office Action dated Apr. 4, 2016, for U.S. Appl. No. 14/384,590.
US Office Action dated Nov. 30, 2016, for U.S. Appl. No. 14/384,590.

* cited by examiner

*Primary Examiner* — Irina S Zemel
(74) *Attorney, Agent, or Firm* — Birch, Stewart, Kolasch & Birch, LLP

(57) ABSTRACT

An in-mold foaming molded product having a thin wall part of the present invention contains expanded polypropylene resin particles. The expanded polypropylene resin particles include a polypropylene resin composition that contains an aliphatic diethanolamine fatty acid ester and an aliphatic diethanolamine in a total amount of not less than 0.1 part by weight but not greater than 5 parts by weight with respect to 100 parts by weight of polypropylene resin.

11 Claims, 4 Drawing Sheets

IN-MOLD FOAM MOLDED BODY COMPRISING POLYPROPYLENE RESIN FOAM PARTICLES AND METHOD FOR PRODUCING SAME

TECHNICAL FIELD

The present invention relates to (i) an in-mold foaming molded product containing expanded polypropylene resin particles, and (ii) a method of producing the in-mold foaming molded product. More specifically, the present invention relates to an in-mold foaming molded product having a thin wall part that has an excellent filling property of filling with expanded polypropylene resin particles and an excellent surface property.

BACKGROUND ART

An expanded polypropylene resin molded product is excellent in physical properties such as a shock absorbing property and a heat insulating property, and is used in various fields. For example, an expanded polypropylene resin molded product is used as a packing material, a buffer material, a heat insulating material, or a construction material. In particular, it is relatively easy to produce products having various shapes by use of an in-mold foaming molding method in which a mold is filled with expanded polypropylene resin particles and is heated with use of steam or the like so as to fuse the expanded polypropylene resin particles with one another and to consequently produce an expanded molded product having a predetermined shape. The in-mold foaming molding method is thus employed in various applications.

It is known that a polypropylene resin in-mold foaming molded product can have a shape such as a cuboid shape, a cylindrical shape, or a box shape. It is also known that an in-mold foaming molded product has a complicatedly-shaped part, such as (i) a rib of a container such as a box-shaped returnable delivery container or a storage container, the rib including a partition which partitions articles to be delivered or stored, (ii) open parts of a box-shaped returnable delivery container into which open parts a user puts his/her hands to lift up the box-shaped returnable delivery container, or (iii) a part of a main material for an automobile bumper in which part a through hole is intentionally formed so that a fog lamp etc. is provided in the through hole.

For such a complicatedly-shaped part, a thin wall part whose thickness is further reduced is often required and designed. It is difficult to fill, with expanded polypropylene resin particles, a portion of a mold for use in in-mold molding which portion corresponds to the thin wall part. This causes a deterioration in surface property of the thin wall part of an in-mold foaming molded product to be produced. Specifically, a gap between expanded polypropylene resin particles on a surface of the thin wall part of the in-mold foaming molded product is widened. This makes convexoconcave of the surface prominent. Moreover, expanded polypropylene resin particles poorly fuse with one another at an edge part of the thin wall part in which edge part surfaces intersect with each other. A ridge line of the edge part is not smooth but is uneven. In a case where the edge part is rubbed with a finger, the expanded polypropylene resin particles of the edge part peel off. In a case where the in-mold foaming molded product is employed as a container such a box-shaped returnable delivery container or a storage container, particles which have peeled off will adhere to an article to be stored or will be mixed with the article as a foreign material in the container. This problem is really serious in a case where a precision machine etc. is stored in the container.

For example, Patent Literature 1 discloses an in-mold foaming molded product which is produced with use of expanded polypropylene resin particles that contain (i) a mixture of specific two kinds of polypropylene resin and (ii) petroleum resin and/or terpene resin so that the in-mold foaming molded product has a thin wall part whose surface appearance is satisfactory.

However, the two kinds of polypropylene resin of Patent Literature 1 are limited to a polypropylene resin that contains butene-1 as a comonomer. The in-mold foaming molded product including the polypropylene resin is excellent in rigidity but poor in shock absorbing property and cushion property. Therefore, the in-mold foaming molded product is not suitable to be employed as a material for a container such as a box-shaped returnable delivery container or a storage container which container is used to deliver a fragile article. In order to improve such a poor shock absorbing property and cushion property, if a propylene/ethylene copolymer that contains no butene-1 is employed as the polypropylene resin of the in-mold foaming molded product, it is possible to easily attain a satisfactory shock absorbing property and cushion property. In this case, however, surface appearance of a thin wall part is deteriorated, and/or an edge part of the thin wall part peels off.

CITATION LIST

Patent Literature 1
Japanese Patent Application Publication, Tokukai, No. 2008-106150 A

SUMMARY OF INVENTION

Technical Problem

An object of the present invention is to improve surface appearance of a thin wall part of a polypropylene resin in-mold foaming molded product that contains expanded polypropylene resin particles.

Solution to Problem

The inventors of the present invention diligently studied how to improve surface appearance of a thin wall part of a polypropylene resin in-mold foaming molded product that contains expanded polypropylene resin particles. As a result of the diligent study, the inventors found that surface appearance of a thin wall part of a polypropylene resin in-mold foaming molded product was improved by producing the polypropylene resin in-mold foaming molded product with use of expanded polypropylene resin particles that include a polypropylene resin composition that contains an aliphatic diethanolamine fatty acid ester and an aliphatic diethanolamine. The inventors attained the present invention based on the finding.

That is, the present invention includes the following in-mold foaming molded product having a thin wall part, and the following method of producing the in-mold foaming molded product.

An in-mold foaming molded product containing a thin wall part, each of the in-mold foaming molded product and the thin wall part including expanded polypropylene resin particles, the expanded polypropylene resin particles including a polypropylene resin composition that contains an aliphatic diethanolamine fatty acid ester and an aliphatic diethanolamine in a total amount of not less than 0.1 part by weight but not greater than 5 parts by weight with respect to 100 parts by weight of polypropylene resin.

A method of producing an in-mold foaming molded product having a thin wall part, the method including the steps of:

filling a mold with expanded polypropylene resin particles; and heating the expanded polypropylene resin particles in the mold, the expanded polypropylene resin particles including a polypropylene resin composition that contains an aliphatic diethanolamine fatty acid ester and an aliphatic diethanolamine in a total amount of not less than 0.1 part by weight but not greater than 5 parts by weight with respect to 100 parts by weight of polypropylene resin.

Advantageous Effects of Invention

Improved is surface appearance of a thin wall part of a polypropylene resin in-mold foaming molded product of the present invention which contains expanded polypropylene resin particles that contain an aliphatic diethanolamine fatty acid ester and an aliphatic diethanolamine.

BRIEF DESCRIPTION OF DRAWINGS

FIG. 1 specifically illustrates a box-shaped in-mold foaming molded product having a bottom surface on which upper surface four ribs having respective different heights are placed.

FIG. 2 illustrates a part corresponding to a surface A illustrated in FIG. 1. In FIG. 2, a surface B1 is parallel to a surface B2.

FIG. 3 illustrates a part corresponding to a circular surface Q illustrated in FIG. 1.

FIG. 4 illustrates the part corresponding to the surface A illustrated in FIG. 1. In FIG. 4, a surface B11 is not parallel to a surface B12.

FIG. 5 illustrates the part corresponding to the surface A illustrated in FIG. 1 (a surface B3 is parallel to a surface B4).

FIG. 8 specifically illustrates a box-shaped in-mold foaming molded product having a bottom surface on which upper surface one rib is placed.

In FIG. 9, a horizontal axis shows temperature, a vertical axis shows quantity of heat to be absorbed, Ql represents an area enclosed by a dashed segment A-B and a melting heat quantity peak on a low temperature side, and Qh represents an area enclosed by a dashed segment A-C and a melting heat quantity peak on a high temperature side.

DESCRIPTION OF EMBODIMENTS

Figure 1:
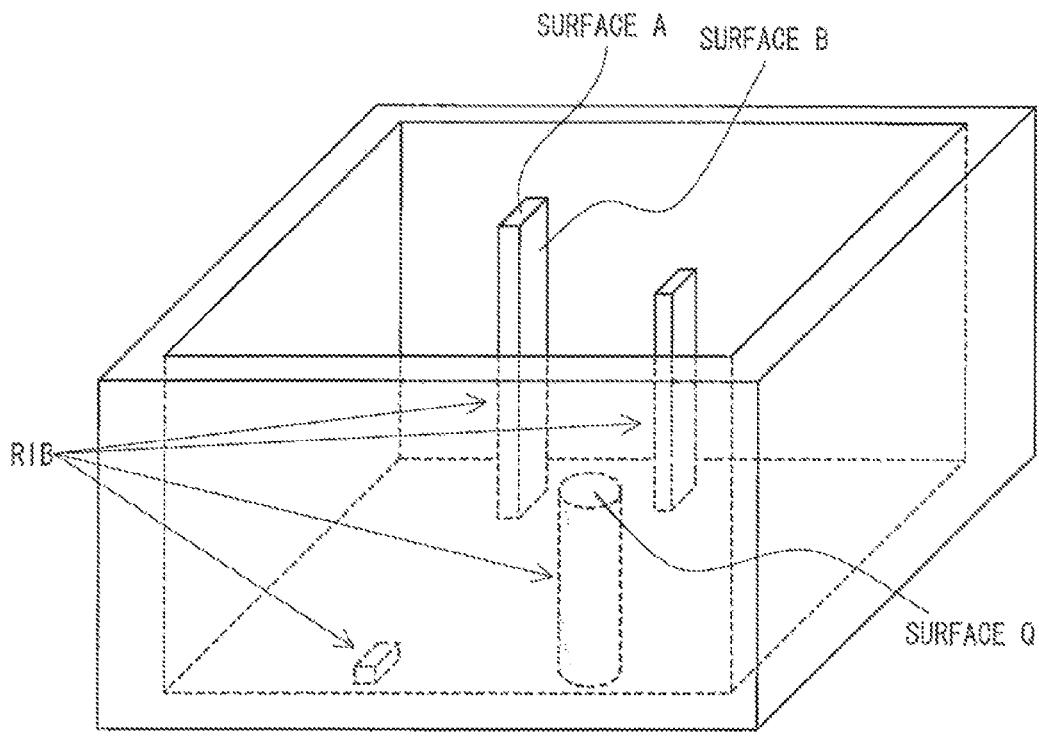
FIG. 1 illustrates an example of a polypropylene resin in-mold foaming molded product having a thin wall part.

A polypropylene resin in-mold foaming molded product of the present invention is an in-mold foaming molded product having a thin wall part.

A "thin wall part" of the in-mold foaming molded product which thin wall part includes expanded polypropylene resin particles in the present invention is a part having a shortest distance which is a distance of not less than one expanded polypropylene resin particle but not more than four expanded polypropylene resin particles. The shortest distance is a distance between one point of one of a pair of surfaces and the other of the pair of surfaces which face each other on at least one portion (hereinafter referred to simply as "shortest distance"). The pair of surfaces which face each other may be parallel or not. In addition, the "surfaces" may be flat or curve.

In the present invention, in a case where at least one surface of the pair of surfaces is flat, the "shortest distance" is a distance from one point on the other surface of the pair of surfaces to a contact point where the at least one surface contacts with a line which vertically extends from the one point to the at least one surface.

In a case where a part of an in-mold foaming molded product has a circular shape, a substantially circular shape, or an elliptical shape, the part has one closed surface but does not actually have two surfaces. However, the part having such a shape is regarded as a thin wall part of the present invention on the basis of the following definition. That is, in a case where the part has the circular shape or the substantially circular shape, a diameter of the circular shape or the substantially circular shape is set to a shortest distance of the part. In a case where the part has the elliptical shape, a length of a shorter axis (minor axis) of the elliptical shape is set to a shortest distance of the part. In a case where (i) the shortest distance of the part is a distance of not less than one expanded polypropylene resin particle but not more than four expanded polypropylene resin particles and (ii) the part contains expanded polypropylene resin particles, the part is regarded as a thin wall part of the preset invention.

Note here that the number of expanded polypropylene resin particles in a shortest distance is the number of expanded polypropylene resin particles which are present across a straight line corresponding to the shortest distance. Therefore, an expanded polypropylene resin particle which is merely in contact with the straight line is not included in the number of expanded polypropylene resin particles in the shortest distance.

Note also that, even if the part which meets the definition has other two surfaces (i) which face each other and (ii) between which expanded polypropylene resin particles other than one to four expanded polypropylene resin particle(s) are present, the part is regarded as the "thin wall part" of the present invention.

In order that the effect of the present invention is remarkably brought about, the shortest distance is preferably a distance of not less than one but not more than three expanded polypropylene resin particle(s), more preferably a distance of not less than one but not more than two expanded polypropylene resin particle(s), most preferably a distance of one expanded polypropylene resin particle.

There is a case where the number of expanded polypropylene resin particles which are present in a shortest distance of a part of an in-mold foaming molded product varies in the part. In the present invention, however, it is defined that the number of expanded polypropylene resin particles in a shortest distance is a smallest number of expanded polypropylene resin particles which are present in the shortest distance.

The following description will further discuss, with reference to the drawings, an example of a thin wall part of an in-mold foaming molded product of the present invention. FIG. 1 illustrates, as an example of a polypropylene resin in-mold foaming molded product, a box-shaped in-mold foaming molded product having a bottom surface on which upper surface four ribs which are different in height and shape from one another are placed.

Figure 2:
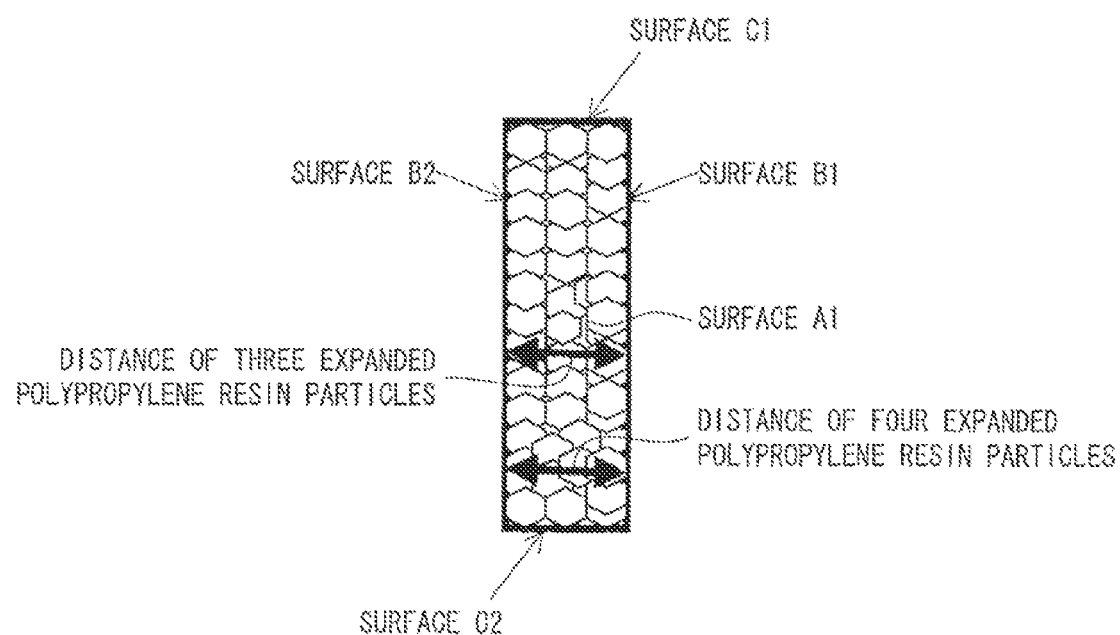
FIG. 2 is an enlarged view of a rib of the polypropylene resin in-mold foaming molded product illustrated in FIG. 1 which rib corresponds to a thin wall part of the present invention.

FIG. 2 illustrates an enlarged view of a rib (part) of the four ribs of the box-shaped in-mold foaming molded product illustrated in FIG. 1 which rib has a surface A, the enlarged view being viewed from above the box-shaped in-mold foaming molded product. Each of hexagons and other polygons, illustrated in a surface A1, represents an expanded polypropylene resin particle (note that the surface A1 illustrated in FIG. 2 corresponds to the surface A illustrated in FIG. 1, and a surface B1 is parallel to a surface B2). According to the definition, a shortest distance between the surface B1 and the surface B2 of the rib illustrated in FIG. 2 is a distance of three expanded polypropylene resin particles, though four expanded polypropylene resin particles are also present in the shortest distance. That is, the rib having the surface A1 is a "thin wall part" of the present invention.

Figure 3:
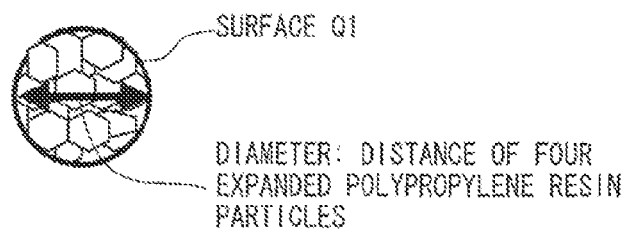
FIG. 3 is an enlarged view of a rib of the polypropylene resin in-mold foaming molded product illustrated in FIG. 1 which rib corresponds to a thin wall part of the present invention.

FIG. 3 illustrates an enlarged view of a rib (part) of the four ribs of the box-shaped in-mold foaming molded product illustrated in FIG. 1 which rib has a circular surface Q, the enlarged view being viewed from above the box-shaped in-mold foaming molded product. The circular surface Q has a diameter part where four expanded polypropylene resin particles are present. Therefore, the rib having the circular surface Q1 is a "thin wall part" of the present invention according to the definition (note that the surface Q1 illustrated in FIG. 3 corresponds to a surface Q illustrated in FIG. 1).

Figure 4:
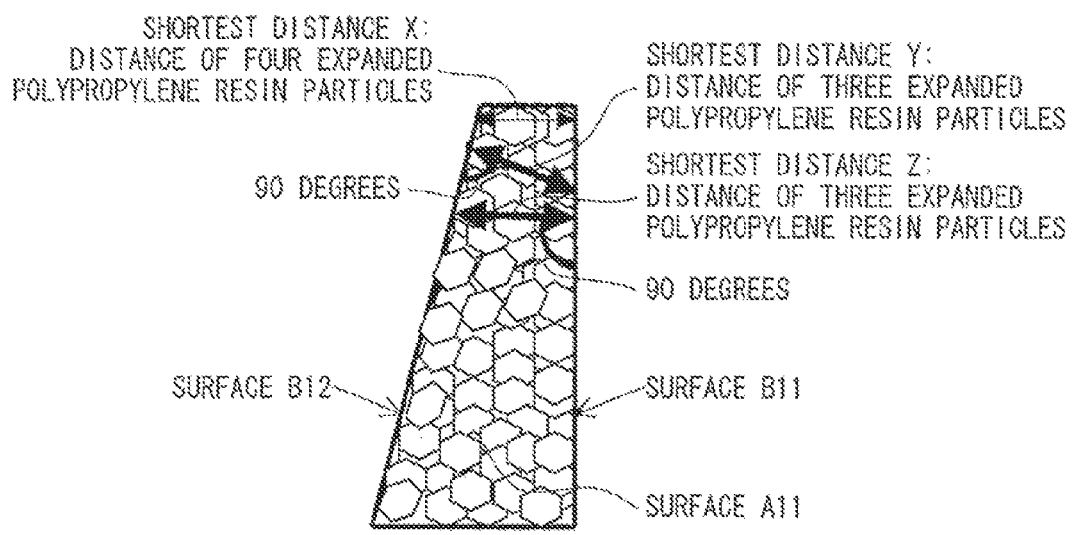
FIG. 4 is an enlarged view of a rib of the polypropylene resin in-mold foaming molded product illustrated in FIG. 1 which rib corresponds to a thin wall part of the present invention.

FIG. 4 is a view illustrating a case where the surface B1 and the surface B2 which are illustrated in FIG. 2 are not parallel to each other (note that a surface A11 illustrated in FIG. 4 corresponds to the surface A illustrated in FIG. 1). In FIG. 4, a shortest distance X is a distance of four expanded polypropylene resin particles, and each of shortest distances Y and Z is a distance of three expanded polypropylene resin particles. Therefore, a shortest distance of a rib having the surface A11 is the distance of three expanded polypropylene resin particles according to the definition. That is, the rib having the surface A11 is a "thin wall part" of the present invention.

Figure 5:
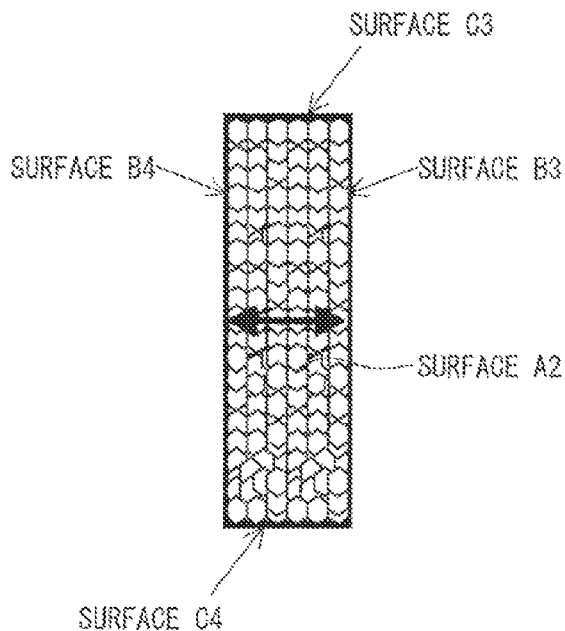
FIG. 5 is an enlarged view of a rib of a polypropylene resin in-mold foaming molded product which rib does not correspond to a thin wall part of the present invention. The rib is filled with expanded polypropylene resin particles smaller in average diameter than those illustrated in FIG. 2.

FIG. 5 illustrates an enlarged view of a rib which is identical in shape to that illustrated in FIG. 2 but is filled with expanded polypropylene resin particles smaller in average diameter than those of the rib illustrated in FIG. 2 (note that a surface A2 illustrated in FIG. 5 corresponds to the surface A illustrated in FIG. 1).

A shortest distance between a surface B3 and a surface B4 of the rib illustrated in FIG. 5 is a distance of not less than six expanded polypropylene resin particles. Therefore, the shortest distance is a distance of six expanded polypropylene resin particles according to the definition. That is, the rib having the surface A2 is not a "thin wall part" of the present invention.

As such, whether or not a rib is a "thin wall part" of the present invention is not determined merely depending on a distance between two surfaces, but is affected by, for example, an average diameter of an expanded polypropylene resin particle which is employed as a material for an in-mold foaming molded product. Note, however, that a distance between two surfaces is preferably not less than 1 mm but not more than 10 mm, more preferably not less than 2 mm but not more than 7 mm so that the effect of the present invention is more remarkably brought about.

Note that it is not necessary that all parts of an in-mold foaming molded product of the present invention are thin wall parts, but at least one of the all parts of the in-mold foaming molded product should be a thin wall part. For example, in a case where one of the four ribs illustrated in FIG. 1 is a "thin wall part", it does not matter whether or not the others of the four ribs and a part such as a box-shaped wall surface (upright wall surface) are "thin wall parts".

The above has described a case where a shape of a cross section of one part that is a thin wall part is uniform. In a case where the shape of the cross section of the one part that is the thin wall part varies, part having such a nonuniform cross section is cut by use of a cutter etc. so that the nonuniform cross section of the part is exposed, and then it is determined according to the definition whether or not the part whose nonuniform cross section is exposed is a "thin wall part".

A thin wall part of the present invention is not particularly limited. It is, however, preferable that the thin wall part is a rib which protrudes from one flat surface such as the above-described flat surface. Note that a "rib" of the present invention means a protrusion which protrudes from one part of at least one flat surface. Examples of the protrusion include the ribs illustrates in FIG. 1. The "rib" of the present invention includes a "partition" which extends from a first upright wall surface to a second upright wall surface which faces the first upright wall surface so as to completely partition a housing section, though such a partition is not illustrated in FIG. 1.

Examples of an in-mold foaming molded product having a rib which protrudes from one flat surface include (i) an in-mold foaming molded product configured to house an article in each section partitioned by a rib and (ii) an in-mold foaming molded product, such as an automobile tibia pad, which has a plurality of ribs. In terms of being often designed so as to be further reduced in thickness and bringing about an outstanding effect of surface appearance, the in-mold foaming molded product having the rib which protrudes from the one flat surface is more preferably the in-mold foaming molded product configured to house an article in the each section partitioned by the rib, most preferably a box-shaped and/or tray-shaped in-mold foaming molded product configured to have an internal part which is partitioned into sections by a rib so as to house an article in each of the sections.

Such in-mold foaming molded products are suitably applied to containers such as a tool housing container, a returnable delivery container for delivering an electronic component, a returnable delivery container for delivering an automobile component, a returnable delivery container for delivering dishes, a returnable delivery container for delivering a glass substrate, and a tool box.

A polypropylene resin in-mold foaming molded product of the present invention has a thin wall part that contains expanded particles that includes a polypropylene resin composition that contains (i) a specific amount of an aliphatic diethanolamine fatty acid ester (later described) and (ii) a specific amount of an aliphatic diethanolamine (later described). Therefore, the thin wall part has an excellent surface appearance.

Specifically, a gap between expanded polypropylene resin particles of a surface of the thin wall part is small, and therefore it is difficult to find convexoconcave of the surface. Moreover, expanded polypropylene resin particles sufficiently fuse with one another in a ridge line part (a part where surfaces intersect with each other) of the thin wall part, the ridge line part has a sharp and smooth ridge line and a satisfactory mold-shape transfer property. Moreover, even if the ridge line part is rubbed with a finger, the expanded polypropylene resin particles of the ridge line part do not easily peel off.

Figure 6:
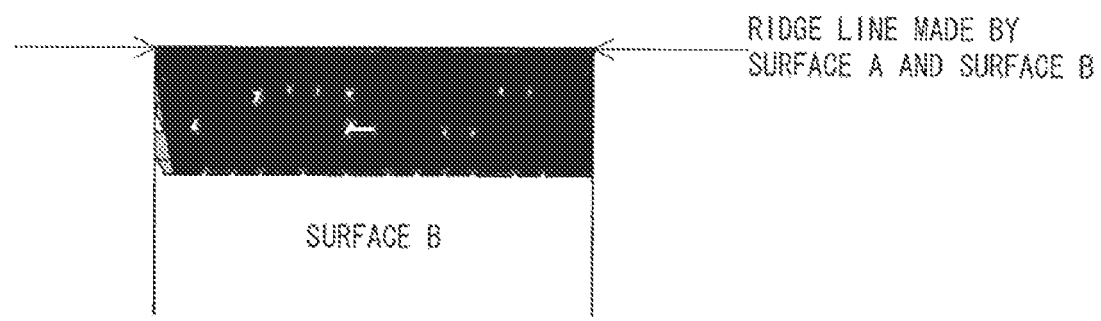
FIG. 6 illustrates an example of a ridge line (a part where surfaces intersect with each other) of a thin wall part of a polypropylene resin in-mold foaming molded product that contains expanded polypropylene resin particles that include a polypropylene resin composition of the present invention.

The following description will further discuss the surface appearance of the thin wall part of the present invention with reference to the drawings. FIG. 6 is an enlarged view illustrating a ridge line part of the rib having the surface A (see FIG. 1) of the polypropylene resin in-mold foaming molded product of the present invention, the ridge line part being made by the surface A and a surface B and being viewed from a right side of FIG. 1.

As illustrated in FIG. 6, the ridge line part made by the surface A and the surface B has a smooth ridge line, because the expanded polypropylene resin particles sufficiently fuse with one another in the ridge line part of the polypropylene resin in-mold foaming molded product of the present invention which contains the expanded polypropylene resin particles that include the polypropylene resin composition that contains the specific amount of the aliphatic diethanolamine fatty acid ester and the specific amount of the aliphatic diethanolamine. Even if the ridge line part of the thin wall part of the polypropylene resin in-mold foaming molded product of the present invention is rubbed with a finger, the expanded polypropylene resin particles of the ridge line part do not easily peel off.

Figure 7:
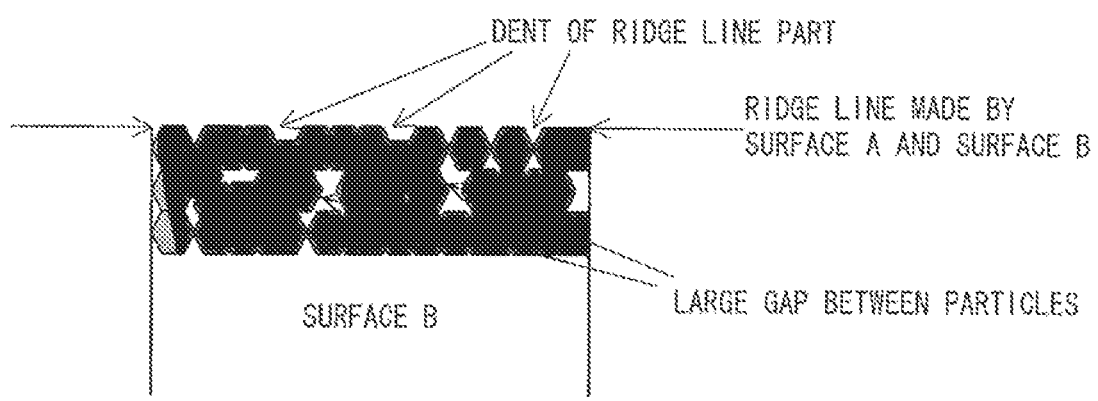
FIG. 7 illustrates an example of a ridge line (a part where surfaces intersect with each other) of a thin wall part of a polypropylene resin in-mold foaming molded product that contains expanded polypropylene resin particles that include a conventional polypropylene resin composition.

On the other hand, FIG. 7 illustrates an in-mold foaming molded product which is produced by a conventional technique and which does not contain the polypropylene resin particles of the present invention. As is clear from FIG. 7, expanded polypropylene resin particles poorly fuse with one another, some gaps between the expanded polypropylene resin particles are large, and a ridge line part made by a surface A and a surface B is uneven. Therefore, in a case where the ridge line part of the in-mold foaming molded product is rubbed with a finger, the expanded polypropylene resin particles of the ridge line part easily peel off.

The polypropylene resin in-mold foaming molded product of the present invention can be produced with use of expanded polypropylene resin particles (later described) by being molded by use of a typical method of producing an in-mold foaming molded product. Examples of the method include a method of producing an in-mold foaming molded product by (i) filling a closable but not sealable mold with the expanded polypropylene resin particles, (ii) heating the mold with use of steam etc. as a heating medium at a heated steam pressure of approximately not less than 0.05 MPa (gage pressure) but not greater than 0.5 MPa (gage pressure) for approximately not less than 3 seconds but not greater than 30 seconds so as to fuse the expanded polypropylene resin particles with one another, (iii) water-cooling the mold down to a temperature that will allow prevention of deformation of a produced in-mold foaming molded product after it is taken out of the mold, and (iv) opening the mold.

The expanded polypropylene resin particles (later described) of the present invention can be molded by in-mold foaming through a conventionally known method such as (i) a method of molding the expanded polypropylene resin particles without processing the expanded polypropylene resin particles, (ii) a method of injecting an inorganic gas such as air into the expanded polypropylene resin particles in advance so as to impart a foaming ability, or (iii) a method of filling a mold with the expanded polypropylene resin particles in a compressed state.

The expanded polypropylene resin particles of the present invention are expanded particles that include a polypropylene resin composition that contains a specific amount of an aliphatic diethanolamine fatty acid ester and a specific amount of an aliphatic diethanolamine.

A polypropylene resin for use in the present invention is not particularly limited. Examples of the polypropylene resin encompass a polypropylene homopolymer, an ethylene/propylene random copolymer, a butene-1/propylene random copolymer, an ethylene/butene-1/propylene random copolymer, an ethylene/propylene block copolymer, a butene-1/propylene block copolymer, a propylene-chlorinated vinyl copolymer, and a propylene/maleic anhydride copolymer. Among these, the ethylene/propylene random copolymer and the ethylene/butene-1/propylene random copolymer are more preferably because they have good foamability and good moldability.

The ethylene/propylene random copolymer and the ethylene/butene-1/propylene random copolymer each preferably have an ethylene content of not less than 0.2 weight % but not greater than 10 weight % with respect to 100 weight % of the copolymer. Note that the expression "butene-1" is equal in meaning to "1-butene".

The ethylene/butene-1/propylene random copolymer preferably has a butane content of not less than 0.2 weight % but not greater than 10 weight % with respect to 100 weight % of the copolymer. Note that the ethylene/butene-1/propylene random copolymer preferably has a total content of ethylene and butene-1 of not less than 0.5 weight % but not greater than 10 weight % with respect to 100 weight % of the copolymer.

In a case where the copolymers each have an ethylene or butene-1 content of less than 0.2 weight %, the copolymers tend to have a lower foamability and/or a lower moldability. In a case where the copolymers each have an ethylene or butene-1 content of greater than 10 weight %, the copolymers tend to have a lower mechanical property.

A melting point of the polypropylene resin for use in the present invention is not particularly limited. The melting point is, for example, preferably (i) not lower than 125° C.

but not higher than 155° C., more preferably (ii) not lower than 130° C. but not higher than 150° C. A polypropylene resin with a melting point lower than 125° C. tends to be low in heat resistance. A polypropylene resin with a melting point higher than 155° C. tends to have difficulty increasing an expanding ratio of the polypropylene resin.

The melting point of the polypropylene resin is measured by differential scanning calorimetry (hereinafter referred to as "DSC"). Specifically, the melting point is found as a melting peak temperature in a second temperature rise on a DSC curve obtained by (i) raising a temperature of 5 to 6 mg of the polypropylene resin from 40° C. to 220° C. at a heating rate of 10° C./min so as to melt the polypropylene resin, (ii) lowering the temperature from 220° C. to 40° C. at a cooling rate of 10° C./min so as to crystallize the polypropylene resin, and then (iii) raising the temperature again from 40° C. to 220° C. at the heating rate of 10° C./min.

A melt index (hereinafter referred to as "MI") of the polypropylene resin for use in the present invention is not particularly limited. The MI is preferably (i) not less than 3 g/10 min but not greater than 30 g/10 min, more preferably (ii) not less than 4 g/10 min but not greater than 20 g/10 min, further preferably (iii) not less than 5 g/10 min but not greater than 18 g/10 min.

A polypropylene resin having an MI smaller than 3 g/10 min tends to have difficulty increasing an expanding ratio of the polypropylene resin. In a case where the MI of the polypropylene resin is greater than 30 g/10 min, cells in expanded polypropylene resin particles produced tend to be continuous with one another. This results in a decrease in compressive strength or surface property of a produced polypropylene resin in-mold foaming molded product.

In a case where the MI of the polypropylene resin is in a range of not less than 3 g/10 min but not greater than 30 g/10 min, it is easy to produce expanded polypropylene resin particles having a relatively large expanding ratio. Further, in a case where a polypropylene resin in-mold foaming molded product is produced by molding such expanded polypropylene resin particles by means of in-mold foaming, the polypropylene resin in-mold foaming molded product has an excellent surface appearance and a low rate of dimensional shrinkage.

The MI has a value measured with use of an MI measuring instrument described in JIS K7210:1999 and under a condition involving (i) an orifice having a diameter of 2.0959±0.005 mm and a length of 8.000±0.025 mm, (ii) a load of 2160 g, and (iii) a temperature of 230° C.±0.2° C.

A polymerization catalyst for use in synthesizing the polypropylene resin for use in the present invention is not particularly limited, and may be, for example, a Ziegler catalyst or a metallocene catalyst.

An in-mold foaming molded product of the present invention improves surface appearance of a thin wall part by being produced with use of expanded polypropylene resin particles that include a polypropylene resin composition that contains an aliphatic diethanolamine fatty acid ester and an aliphatic diethanolamine.

On the other hand, an in-mold foaming molded product tends to have difficulty improving surface appearance in a case where the in-mold foaming molded product is produced with use of expanded polypropylene resin particles that include a polypropylene resin composition that contains an aliphatic diethanolamine fatty acid ester or an aliphatic diethanolamine.

That is, the inventors of the present invention (i) intentionally paid attention to an aliphatic diethanolamine fatty acid ester and an aliphatic diethanolamine which were conventionally considered to have difficulty improving surface appearance of expanded polypropylene resin particles, and (ii) used a specific amount of the aliphatic diethanolamine fatty acid ester in combination with a specific amount of the aliphatic diethanolamine, so that the inventors found that such use in combination improved surface appearance of expanded polypropylene resin particles.

A polypropylene resin composition of the present invention has a total content of an aliphatic diethanolamine fatty acid ester and an aliphatic diethanolamine of (i) not less than 0.1 part by weight but not greater than 5 parts by weight, more preferably (ii) not less than 0.15 part by weight but not greater than 3 parts by weight, further preferably (iii) not less than 0.5 part by weight but not greater than 1.5 parts by weight, each with respect to 100 parts by weight of polypropylene resin.

In a case where the total content of an aliphatic diethanolamine fatty acid ester and an aliphatic diethanolamine is less than 0.1 part by weight, there is a tendency to have difficulty improving surface appearance of a thin wall part. In a case where the total content of an aliphatic diethanolamine fatty acid ester and an aliphatic diethanolamine is greater than 5 parts by weight, an effect of improving surface appearance of a thin wall part is saturated, and there is a tendency to have difficulty producing polypropylene resin particles (later described) so that the polypropylene resin particles are stable in weight. Further, in the case, expanded polypropylene resin particles and a polypropylene resin in-mold foaming molded product tend to have sticky surfaces. Note that, in a case where the total content is greater than 3 parts by weight with respect to 100 parts by weight of the polypropylene resin, there is a case where (i) stability of a dispersion liquid is deteriorated in a first-stage foaming step (later described) and (ii) produced first-stage expanded particles adhere to one another (that is, particles which adhere to one another are obtained). Inclusion of such particles which adhere to one another will make a subsequent molding step unstable. This sometimes makes it necessary to, for example, remove such particles which adhere to one another by use of a sieve before the molding step.

In the present invention, which uses an aliphatic diethanolamine fatty acid ester and an aliphatic diethanolamine, a weight proportion of the aliphatic diethanolamine fatty acid ester with respect to a total weight of the aliphatic diethanolamine fatty acid ester and the aliphatic diethanolamine is not particularly limited. The weight proportion of the aliphatic diethanolamine fatty acid ester is preferably (i) not less than 5 weight % but not greater than 95 weight %, more preferably (ii) not less than 20 weight % but not greater than 95 weight %, further preferably (iii) not less than 40 weight % but not greater than 95 weight %, each with respect to 100 weight % of the total weight of the aliphatic diethanolamine fatty acid ester and the aliphatic diethanolamine.

In a case where the weight proportion of the aliphatic diethanolamine fatty acid ester is not less than 5 weight %, there is a tendency to satisfactorily bring about the effect of improving surface appearance of a thin wall part and to suppress deterioration of the polypropylene resin. In a case where the weight proportion of the aliphatic diethanolamine fatty acid ester is not greater than 95 weight %, it is possible to suitably bring about the effect of improving surface appearance of a thin wall part.

The aliphatic diethanolamine fatty acid ester for use in the present invention is not particularly limited. It is, however, preferable that the aliphatic diethanolamine fatty acid ester be a compound represented by the following General Formula (1), in order that (i) the effect of improving surface appearance of a thin wall part is satisfactorily brought about, (ii) no surface stickiness is caused and (iii) deterioration in resin is prevented from progressing.

[Chem. 1]

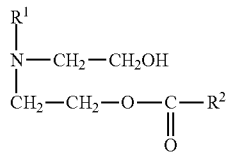

General Formula (1)

where $R^1$ is a C12 to C24 alkyl group, $R^2$ is a C11 to C23 alkyl group, and $R^1$ and $R^2$ may be identical to or different from each other.

The aliphatic diethanolamine fatty acid ester may be composed solely of a single compound containing the predetermined $R^1$ and $R^2$, or may be a mixture of a plurality of compounds represented by General Formula (1). The number of carbon atoms of at least one of $R^1$ and $R^2$ in their compounds is different.

Specific examples of the aliphatic diethanolamine fatty acid ester encompass:

lauryl diethanolamine monolauric acid ester, lauryl diethanolamine monomyristic acid ester, lauryl diethanolamine monopentadecylic acid ester, lauryl diethanolamine monopalmitic acid ester, lauryl diethanolamine monomargaric acid ester, lauryl diethanolamine monostearic acid ester, lauryl diethanolamine monoarachidic acid ester, lauryl diethanolamine monobehenic acid ester, and lauryl diethanolamine monolignoceric acid ester;

myristyl diethanolamine monolauric acid ester, myristyl diethanolamine monomyristic acid ester, myristyl diethanolamine monopentadecylic acid ester, myristyl diethanolamine monopalmitic acid ester, myristyl diethanolamine monomargaric acid ester, myristyl diethanolamine monostearic acid ester, myristyl diethanolamine monoarachidic acid ester, myristyl diethanolamine monobehenic acid ester, and myristyl diethanolamine monolignoceric acid ester;

pentadecyl diethanolamine monolauric acid ester, pentadecyl diethanolamine monomyristic acid ester, pentadecyl diethanolamine monopentadecylic acid ester, pentadecyl diethanolamine monopalmitic acid ester, pentadecyl diethanolamine monomargaric acid ester, pentadecyl diethanolamine monostearic acid ester, pentadecyl diethanolamine monoarachidic acid ester, pentadecyl diethanolamine monobehenic acid ester, and pentadecyl diethanolamine monolignoceric acid ester;

palmityl diethanolamine monolauric acid ester, palmityl diethanolamine monomyristic acid ester, palmityl diethanolamine monopentadecylic acid ester, palmityl diethanolamine monopalmitic acid ester, palmityl diethanolamine monomargaric acid ester, palmityl diethanolamine monostearic acid ester, palmityl diethanolamine monoarachidic acid ester, palmityl diethanolamine monobehenic acid ester, and palmityl diethanolamine monolignoceric acid ester;

margaryl diethanolamine monolauric acid ester, margaryl diethanolamine monomyristic acid ester, margaryl diethanolamine monopentadecylic acid ester, margaryl diethanolamine monopalmitic acid ester, margaryl diethanolamine monomargaric acid ester, margaryl diethanolamine monostearic acid ester, margaryl diethanolamine monoarachidic acid ester, margaryl diethanolamine monobehenic acid ester, and margaryl diethanolamine monolignoceric acid ester;

stearyl diethanolamine monolauric acid ester, stearyl diethanolamine monomyristic acid ester, stearyl diethanolamine monopentadecylic acid ester, stearyl diethanolamine monopalmitic acid ester, stearyl diethanolamine monomargaric acid ester, stearyl diethanolamine monostearic acid ester, stearyl diethanolamine monoarachidic acid ester, stearyl diethanolamine monobehenic acid ester, and stearyl diethanolamine monolignoceric acid ester;

arachidyl diethanolamine monolauric acid ester, arachidyl diethanolamine monomyristic acid ester, arachidyl diethanolamine monopentadecylic acid ester, arachidyl diethanolamine monopalmitic acid ester, arachidyl diethanolamine monomargaric acid ester, arachidyl diethanolamine monostearic acid ester, arachidyl diethanolamine monoarachidic acid ester, arachidyl diethanolamine monobehenic acid ester, and arachidyl diethanolamine monolignoceric acid ester;

behenyl diethanolamine monolauric acid ester, behenyl diethanolamine monomyristic acid ester, behenyl diethanolamine monopentadecylic acid ester, behenyl diethanolamine monopalmitic acid ester, behenyl diethanolamine monomargaric acid ester, behenyl diethanolamine monostearic acid ester, behenyl diethanolamine monoarachidic acid ester, behenyl diethanolamine monobehenic acid ester, and behenyl diethanolamine monolignoceric acid ester;

lignoceryl diethanolamine monolauric acid ester, lignoceryl diethanolamine monomyristic acid ester, lignoceryl diethanolamine monopentadecylic acid ester, lignoceryl diethanolamine monopalmitic acid ester, lignoceryl diethanolamine monomargaric acid ester, lignoceryl diethanolamine monostearic acid ester, lignoceryl diethanolamine monoarachidic acid ester, lignoceryl diethanolamine monobehenic acid ester, and lignoceryl diethanolamine monolignoceric acid ester. Any of these may be used alone, or two or more of these may be used in combination.

Among the above aliphatic diethanolamine fatty acid esters, stearyl diethanolamine monostearic acid ester (where $R^1=-(CH_2)_{17}CH_3$, and $R^2=-(CH_2)_{16}CH_3$) is more preferable in terms of good compatibility with the polypropylene resin and ease of achieving the effect of improving surface appearance of a thin wall part.

The aliphatic diethanolamine for use in the present invention is not particularly limited. It is, however, preferable that the aliphatic diethanolamine be a compound represented by the following General Formula (2), in order that (i) the effect of improving surface appearance of a thin wall part is satisfactorily brought about, (ii) no surface stickiness is caused and (iii) deterioration in resin is prevented from progressing.

[Chem. 2]

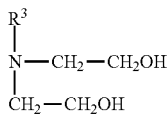

General Formula (2)

where $R^3$ is a C12 to C24 alkyl group.

The aliphatic diethanolamine may be composed solely of a single compound containing the predetermined $R^3$, or may be a mixture of a plurality of compounds represented by General Formula (2). The number of carbon atoms of $R^3$ in their compounds is different.

Specific examples of the aliphatic diethanolamine encompass lauryl diethanolamine, myristyl diethanolamine, pentadecyl diethanolamine, palmityl diethanolamine, margaryl diethanolamine, stearyl diethanolamine, arachidyl diethanolamine, behenyl diethanolamine, and lignoceryl diethanolamine. Any of these may be used alone, or two or more of these may be used in combination.

Among the above aliphatic diethanolamines, stearyl diethanolamine (where $R^3=-(CH_2)_{17}CH_3$) is more preferable in terms of good compatibility with the polypropylene resin, ease of achieving a synergistic effect with stearyl diethanolamine monostearic acid ester, and ease of achieving the effect of improving surface appearance of a thin wall part.

The present invention is not particularly limited in terms of combination in kind of the aliphatic diethanolamine fatty acid ester and the aliphatic diethanolamine. In order to achieve the effect of improving surface appearance of a thin wall part, a combination of the compound represented by General Formula (1) and the compound represented by General Formula (2) is preferable, and in particular, a combination of stearyl diethanolamine monostearic acid ester and stearyl diethanolamine is most preferable.

In order to achieve the effect of improving surface appearance of a thin wall part, the polypropylene resin composition of the present invention preferably further contains an aliphatic alcohol of not less than 0.001 part by weight but not greater than 2 parts by weight with respect to 100 parts by weight of the polypropylene resin. In particular, even if a molding pressure is low, it is easy to achieve the effect of improving surface appearance of a thin wall part thanks to the polypropylene resin composition which further contains such amount of the aliphatic alcohol. In a case where the aliphatic alcohol to be contained in the polypropylene resin composition is less than 0.001 part by weight, there is a tendency to decrease the effect of improving surface appearance of a thin wall part. In a case where the aliphatic alcohol to be contained in the polypropylene resin composition is greater than 2 parts by weight, there is a tendency to increase stickiness.

The aliphatic alcohol is not particularly limited. In order to achieve the effect of improving surface appearance of a thin wall part, a compound represented by the following General Formula (3) is suitably employed as the aliphatic alcohol.

[Chem. 3]

$$R^4-OH \quad\quad \text{General Formula (3)}$$

where $R^4$ is a C12 to C24 alkyl group.

Note here that the aliphatic alcohol may be composed solely of a single compound containing the predetermined $R^4$, or may be a mixture of a plurality of compounds represented by General Formula (3). The number of carbon atoms of $R^4$ in their compounds is different.

Specific examples of the aliphatic alcohol encompass lauryl alcohol, myristyl alcohol, pentadecyl alcohol, palmityl alcohol, margaryl alcohol, stearyl alcohol, arachidyl alcohol, behenyl alcohol, and lignoceryl alcohol. Any of these may be used alone, or two or more of these may be used in combination.

Among the above aliphatic alcohols, stearyl alcohol (where $R^4=-(CH_2)_{17}CH_3$) is preferable in terms of (i) good compatibility with stearyl diethanolamine monostearic acid ester and stearyl diethanolamine and (ii) ease of achieving the effect of improving surface appearance of a thin wall part even if a molding pressure is low.

It is also possible to (i) prepare in advance, with use of a resin which is totally identical to or different from the polypropylene resin serving as a main component of the polypropylene resin composition, a masterbatch including the aliphatic diethanolamine fatty acid ester, the aliphatic diethanolamine, and (as necessary) the aliphatic alcohol, and (ii) mix the masterbatch with the polypropylene resin.

Further, it is also possible to mix in advance the aliphatic diethanolamine fatty acid ester, the aliphatic diethanolamine, and (as necessary) the aliphatic alcohol with one another before they are mixed with the polypropylene resin.

Examples of a commercially available product in which the aliphatic diethanolamine fatty acid ester, the aliphatic diethanolamine, and (as necessary) the aliphatic alcohol are mixed with one another in advance include (i) Electrostripper TS-11B (manufactured by Kao Corporation), a mixture of stearyl diethanolamine monostearic acid ester and stearyl diethanolamine, and (ii) Electrostripper TS-15B (manufactured by Kao Corporation), a mixture of stearyl diethanolamine monostearic acid ester, stearyl diethanolamine, and aliphatic alcohol. In the present invention, it is possible to employ these commercially available products.

The polypropylene resin composition of the present invention can further contain any of various additives provided that the effect of the present invention is not impaired. Such additives encompass, for example, an organic pigment, an antioxidant, a light resistance improving agent, an expansion nucleus agent, a flame retarder, and a water-absorbing compound.

The organic pigment may be, but not limited to, a perylene organic pigment, a polyazo organic pigment, or a quinacridone organic pigment, for example.

The organic pigment is preferably contained in an amount of not less than 0.001 part by weight but not greater than 0.1 part by weight with respect to 100 parts by weight of the polypropylene resin in terms of (i) better dispersibility (coloring uniformity) and (ii) achieving the effect of improving surface appearance of a thin wall part. In a case where the organic pigment is contained in an amount of greater than 0.1 part by weight with respect to 100 parts by weight of the polypropylene resin, expanded polypropylene resin particles each have an extremely small cell diameter, and a polypropylene resin in-mold foaming molded product produced with use of such expanded polypropylene resin particles has a poor surface property. Particularly, there is a tendency to deteriorate surface appearance of a thin wall part. It is also possible to (i) prepare in advance, with use of a resin which is totally identical to or different from the polypropylene resin serving as a main component of the polypropylene resin composition, a masterbatch including the above organic pigments, and (ii) mix the masterbatch with the polypropylene resin.

The antioxidant may be, but not limited to, a phenol antioxidant or a phosphorus-based antioxidant, for example.

The light resistance improving agent may be, but not limited to, a hindered amine light resistance improving agent, for example.

The expansion nucleus agent may be, but not limited to, talc, kaolin, barium sulfate, zinc borate, or silicon dioxide, for example.

The flame retarder may be, but not limited to, a halogen flame retarder, a phosphorus-based flame retarder, or a hindered amine flame retarder, for example.

The water-absorbing compound is, for example, a substance that can absorb water and release the absorbed water to allow the water to act as a foaming agent in foaming the polypropylene resin composition. Specific examples of the water-absorbing compound include polyethyleneglycol, glycerin, and melamine, but the water-absorbing compound is not limited thereto. The water-absorbing compound is, among the above water-absorbing compounds, more preferably polyethyleneglycol, most preferably polyethyleneglycol having an average molecular weight of not less than 200 but not greater than 6000.

In order that that the polypropylene resin composition of the present invention is easy to be used in foam, it is normally preferable that the polypropylene resin composition of the present invention is (i) melt-kneaded in advance with use of an extruder, a kneader, a Banbury mixer, a roller or the like and then (ii) processed into polypropylene resin particles in a desired particle shape such as a columnar shape, an ellipsoidal shape, a spherical shape, a cubic shape, a rectangular shape, or a tube (straw) shape.

The shape of the polypropylene resin particles is not necessarily maintained so as to be identical to that of expanded polypropylene resin particles produced. The polypropylene resin particles may, for example, shrink during a foaming step. In such a case, polypropylene resin particles each having a columnar or ellipsoidal shape may result in expanded polypropylene resin particles each having a spherical shape.

In terms of productivity, the polypropylene resin particles are more preferably produced through, among other methods, a method including (i) melt-kneading the polypropylene resin in an extruder, (ii) extruding the polypropylene resin from an end of the extruder in a strand shape, and (iii) cutting the extruded in the strand shape into the polypropylene resin particles.

During the process of producing the polypropylene resin particles, it is normally preferable that the aliphatic diethanolamine fatty acid ester, the aliphatic diethanolamine, (as necessary) the aliphatic alcohol, and other additives are added to the polypropylene resin before or after the polypropylene resin is melted, and that a resultant mixture is then melt-kneaded in an extruder. With this arrangement, it is possible to uniformly disperse the aliphatic diethanolamine fatty acid ester, the aliphatic diethanolamine, (as necessary) the aliphatic alcohol, and the other additives in the polypropylene resin.

The polypropylene resin particles for use in the present invention have an average particle size of preferably (i) not less than 0.1 mm but not greater than 10 mm, more preferably (ii) not less than 0.5 mm but not greater than 5 mm. This average particle diameter of the polypropylene resin particles is an arithmetic average value of respective particle diameters of any 20 particles of the polypropylene resin particles.

The polypropylene resin particles for use in the present invention have an average weight of preferably (i) not less than 0.1 mg per particle but not greater than 100 mg per particle, more preferably (ii) not less than 0.3 mg per particle but not greater than 10 mg per particle. This average weight is an arithmetic average value of respective weights of any 10 particles of the polypropylene resin particles.

The expanded polypropylene resin particles of the present invention can be produced as follows:

The expanded polypropylene resin particles can be produced by, for example, (i) feeding, into a pressure-resistant vessel, materials such as the polypropylene resin particles, an aqueous medium, an inorganic dispersion agent, and a foaming agent, (ii) dispersing the materials under stirring thereby obtaining a dispersion liquid, (iii) raising a temperature of the dispersion liquid to a temperature not lower than a softening point of the polypropylene resin particles, (iv) as necessary retaining the dispersion liquid for a time period longer than 0 minute but not longer than 120 minutes at a temperature as raised, and then (v) releasing the dispersion liquid in the pressure-resistant vessel to an area having a pressure lower than an internal pressure of the pressure-resistant vessel.

Hereinafter, the above foaming step is referred to as "first-stage foaming step", and expanded polypropylene resin particles produced through the first-stage foaming step are referred to as "first-stage expanded particles". The above dispersion liquid is a mixture liquid prepared by (i) feeding, into a pressure-resistant vessel, materials such as the polypropylene resin particles, an aqueous medium, an inorganic dispersion agent, and a foaming agent and (ii) dispersing a mixture of the materials under stirring.

For the sake of reliable foamability, raising a temperature inside the pressure-resistant vessel to a temperature not lower than the softening point of the polypropylene resin particles is preferably carried out in such a way that the temperature is raised to a target temperature within a range from a temperature lower than the melting point of the polypropylene resin by 20° C. to a temperature higher than the melting point of the polypropylene resin by 10° C. or within a range from a temperature lower than a melting point of the polypropylene resin particles by 20° C. to a temperature higher than the melting point of the polypropylene resin particles by 10° C.

The target temperature is selected as appropriate depending on a kind of the polypropylene resin serving as a raw material, an expanding ratio, a DSC ratio which will be described below, etc. The target temperature also needs changing as appropriate depending on a foaming agent to be used. The melting point of the polypropylene resin particles is measured by DSC. Specifically, the melting point is found as a melting peak temperature in a second temperature rise on a DSC curve obtained by (i) raising a temperature of 5 to 6 mg of the polypropylene resin particles from 40° C. to 220° C. at a heating rate of 10° C./min so as to melt the polypropylene resin particles, (ii) lowering the temperature from 220° C. to 40° C. at a cooling rate of 10° C./min so as to crystallize the polypropylene resin particles, and then (iii) raising the temperature again from 40° C. to 220° C. at the heating rate of 10° C./min.

The area having a pressure lower than the internal pressure of the pressure-resistant vessel is preferably an area having atmospheric pressure.

Examples of the aqueous medium for use in the present invention encompass water, alcohol, ethylene glycol, and glycerin. Any of these may be used alone or in combination. Water is preferably used, most preferably used alone, in terms of better foamability, working efficiency, and safety, for example.

The aqueous medium can be contained in an amount of not less than 50 parts by weight but not greater than 500 parts by weight with respect to 100 parts by weight of the polypropylene resin particles. The aqueous medium is preferably contained in an amount of not less than 100 parts by weight but not greater than 350 parts by weight with respect to 100 parts by weight of the polypropylene resin particles.

Examples of the inorganic dispersion agent for use in the present invention encompass tertiary calcium phosphate, tertiary magnesium phosphate, basic magnesium carbonate, calcium carbonate, basic zinc carbonate, aluminum oxide, iron oxide, titanium oxide, aluminosilicate, kaolin, and barium sulfate. Any of these may be used alone, or two or more of these may be used in combination. The inorganic dispersion is, among the above inorganic dispersion agents, preferably tertiary calcium phosphate, kaolin, or barium sulfate in terms of better stability of the resulting dispersion liquid.

In a case where the stability of the dispersion liquid is decreased, a plurality of polypropylene resin particles may adhere to one another or form lumps in the pressure-resistant vessel. In this case, expanded polypropylene resin particles adhering to one another are produced, or lumps of polypropylene resin particles remain in the pressure-resistant vessel. As a result, it may be impossible to produce expanded polypropylene resin particles, or there may be a decrease in productivity of expanded polypropylene resin particles.

The present invention preferably further uses a dispersion auxiliary agent in order to improve the stability of the dispersion liquid in the pressure-resistant vessel. Examples of the dispersion auxiliary agent encompass sodium dodecyl benzene sulfonate, sodium alkane sulfonate, sodium alkyl sulfonate, sodium alkyl diphenyl ether disulfonate, and sodium α-olefin sulfonate.

The inorganic dispersion agent and the dispersion auxiliary agent are each contained in an amount that depends on (i) a kind thereof or (ii) the kind and amount of the polypropylene resin particles to be used. Normally, with respect to 100 parts by weight of the aqueous medium, (i) the inorganic dispersion agent is preferably contained in an amount of not less than 0.1 part by weight but not greater than 5 parts by weight, and (ii) the dispersion auxiliary agent is preferably contained in an amount of not less than 0.001 part by weight but not greater than 0.3 part by weight.

Examples of the foaming agent for use in the present invention encompass (i) organic foaming agents such as propane, normal butane, isobutane, normal pentane, isopentane, hexane, cyclopentane, and cyclobutane and (ii) inorganic foaming agents such as carbon dioxide, water, air, and nitrogen. Any of these foaming agents may be used alone, or two or more of these foaming agents may be used in combination.

Among the above foaming agents, isobutane and normal butane are more preferable in terms of ease of improving the expanding ratio.

In terms of better safety and better environmental adaptability, the inorganic foaming agents such as carbon dioxide, water, air, and nitrogen are preferably employed, and a foaming agent containing carbon dioxide is more preferably employed.

In the present invention, an amount of the foaming agent is not limited. The foaming agent is contained as appropriate according to a desired expanding ratio of expanded polypropylene resin particles to be produced. The foaming agent is normally contained in an amount of preferably not less than 2 parts by weight but not greater than 60 parts by weight with respect to 100 parts by weight of the polypropylene resin particles.

In a case where water is used as the foaming agent, it is possible to utilize water serving as the aqueous medium for dispersing the polypropylene resin particles in the pressure-resistant vessel. In the case where water is used as the foaming agent as such, containing a water-absorbing compound in the polypropylene resin particles in advance makes it easy for the polypropylene resin particles to absorb the water in the pressure-resistant vessel. As a result, it becomes easy to utilize water as the foaming agent.

The pressure-resistant vessel for use in producing the expanded polypropylene resin particles is not particularly limited provided that the pressure-resistant vessel is capable of resisting a pressure and temperature inside the vessel. Examples of the pressure-resistant vessel encompass an autoclave-type pressure-resistant vessel.

In order to produce expanded polypropylene resin particles having a high expanding ratio, an organic foaming agent such as isobutane or normal butane can be selected as the foaming agent for the first-stage foaming step, or the foaming agent can be contained in a large amount. Alternatively, it is also possible to increase the expanding ratio by (i) producing expanded polypropylene resin particles (first-stage expanded particles) having a relatively low foaming ratio (an expanding ratio of approximately 2 to 35 times) through the first-stage foaming step and then (ii) foaming the produced expanded polypropylene resin particles again.

It is possible to increase the expanding ratio by, for example, (i) performing the first-stage foaming step of producing first-stage expanded particles having an expanding ratio of not less than 2 times but not greater than 35 times, (ii) feeding the first-stage expanded particles into a pressure-resistant vessel, (iii) applying a pressure of not less than 0.1 MPa (gage pressure) but not greater than 0.6 MPa (gage pressure) to the first-stage expanded particles with use of nitrogen, air, carbon dioxide or the like so as to increase a pressure inside the first-stage expanded particles over atmospheric pressure, and (iii) heating the first-stage expanded particles with use of steam or the like so as to further foam the first-stage expanded particles. Herein, the further foaming step is referred to as "second-stage foaming step", and expanded polypropylene resin particles produced through the second-stage foaming step are referred to as "second-stage expanded particles".

The expanded polypropylene resin particles of the present invention each are preferably in a spherical or substantially spherical shape in terms of better filling of a mold during in-mold foaming molding. The shape of the expanded polypropylene resin particles is, however, not limited to such shapes. There is, for example, a case of intentionally producing an in-mold foaming molded product having voids so as to impart sound absorbing property and/or water-permeability to the in-mold foaming molded product. Such a case involves use of expanded polypropylene resin particles in a columnar shape, an ellipsoidal shape, a rectangular shape, or a tube (straw) shape.

In a case where the expanded polypropylene resin particles of the present invention each have a spherical or substantially spherical shape, an average diameter (particle diameter) of the expanded polypropylene resin particles is not particularly limited. The average diameter is selected depending on a size of polypropylene resin particles before being foamed, an expanding ratio, etc. The average diameter is preferably (i) not less than 0.5 mm but not greater than 10 mm, more preferably (ii) not less than 1 mm but not greater than 7 mm, further preferably (iii) not less than 2 mm but not greater than 5 mm. In a case where the average diameter of the expanded polypropylene resin particles is less than 0.5 mm, there is a tendency to decrease working efficiency during in-mold foaming molding. In a case where the average diameter of the expanded polypropylene resin particles is greater than 10 mm, there is a tendency to impose a restriction to a shape of a molded product to be produced, the restriction making it impossible to, for example, produce a molded product having a thin wall part.

This average diameter of the expanded polypropylene resin particles is an arithmetic average value of respective diameters of any 20 particles of the expanded polypropylene resin particles. Note that a diameter of each of the expanded polypropylene resin particles is an arithmetic average value of a largest diameter of and a smallest diameter of the each of the expanded polypropylene resin particles. In a case where the each of the expanded polypropylene resin particles has a spherical or substantially spherical shape, a diameter of the each of the expanded polypropylene resin particles is merely measured.

The expanded polypropylene resin particles of the present invention have an average weight substantially equal to that of the polypropylene resin particles. The average weight of the expanded polypropylene resin particles is preferably (i) not less than 0.1 mg per particle but not greater than 100 mg per particle, more preferably (ii) not less than 0.3 mg per particle but not greater than 10 mg per particle. This average weight of the expanded polypropylene resin particles is an arithmetic average value of respective weights of any 10 particles of the expanded polypropylene resin particles.

The expanded polypropylene resin particles of the present invention have an expanding ratio of preferably (i) not less than 2 times but not greater than 60 times, more preferably (ii) not less than 3 times but not greater than 40 times. This expanding ratio of the expanded polypropylene resin particles is a true expanding ratio calculated from (i) a density of the polypropylene resin composition before being foamed, (ii) the weight of the expanded polypropylene resin particles, and (iii) a submergence volume of the expanded polypropylene resin particles.

Figure 9:
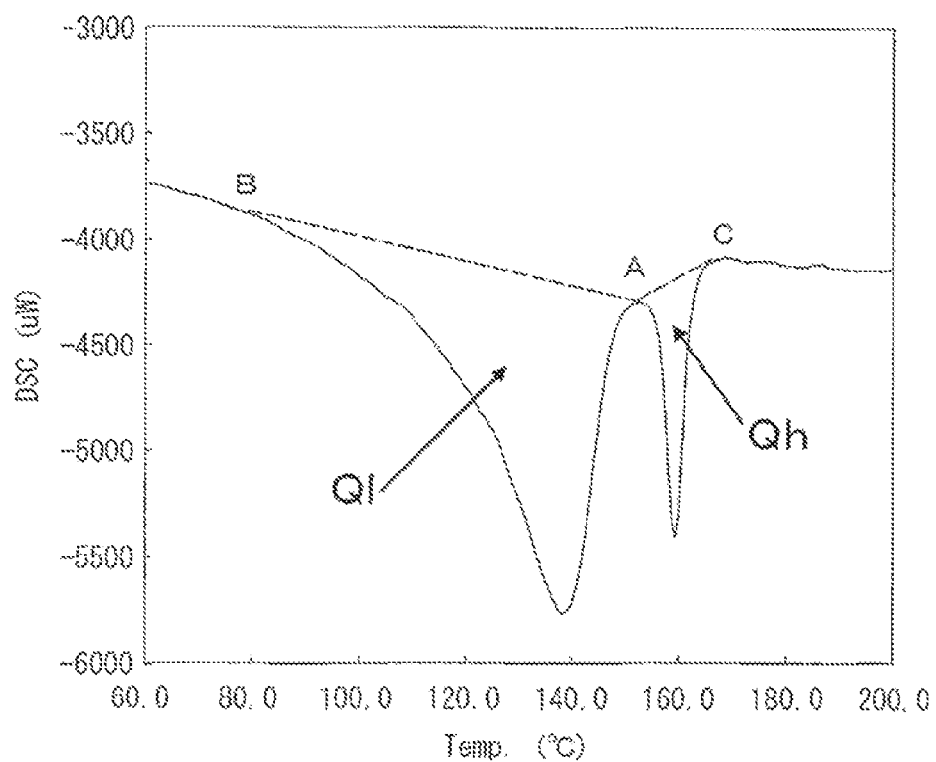
FIG. 9 illustrates an example of a DSC curve of expanded polypropylene resin particles of the present invention which DSC curve is obtained by differential scanning calorimetry (DSC) in which a temperature of the expanded polypropylene resin particles is raised from 40° C. to 220° C. at a heating rate of 10° C./min.

The expanded polypropylene resin particles of the present invention preferably have, as illustrated in FIG. 9, two melting peaks on a DSC curve obtained by heat quantity measurement performed by DSC. Here, a ratio of (i) quantity of heat at the melting peak based on a melting point on a high temperature side to (ii) a total quantity of heat at the two melting peaks, that is, (Qh/(Ql+Qh))×100(%) (herein sometimes referred to as "DSC ratio"), is more preferably (i) not less than 10% but not greater than 50%, most preferably (ii) not less than 15% but not greater than 45%, where Ql indicates a quantity of heat (J/g) at the melting peak based on a melting point on a low temperature side, and Qh indicates the quantity of heat (J/g) at the melting peak based on the melting point on the high temperature side. In a case where the DSC ratio is within the above range, molding can easily have a wide range of processing conditions.

The DSC curve is a curve obtained by raising a temperature of 5 to 6 mg of the expanded polypropylene resin particles from 40° C. to 220° C. at a heating rate of 10° C./min by means of DSC. An example of such a DSC curve is illustrated in FIG. 9.

The quantity of heat Ql at the melting peak based on the melting point on the low temperature side is quantity of heat indicated by an area enclosed by (i) the melting peak based on the melting point on the low temperature side on the DSC curve and (ii) a tangent (segment A-B) extending, to a baseline from which melting starts, from a maximum point between (a) the melting peak based on the melting point on the low temperature side and (b) the melting peak based on the melting point on the high temperature side. The quantity of heat Qh at the melting peak based on the melting point on the high temperature side is quantity of heat indicated by an area enclosed by (i) the melting peak based on the melting point on the high temperature side on the DSC curve and (ii) a tangent (segment A-C) extending, to a baseline at which melting ends, from a maximum point between (a) the melting peak based on the melting point on the low temperature side and (b) the melting peak based on the melting point on the high temperature side.

The DSC ratio can be adjusted by changing (i) the target temperature, up to which the temperature inside the pressure-resistant vessel is to be raised during the foaming step, or (ii) the retention time period during which the dispersion liquid in the pressure-resistant vessel is retained at the target temperature, the retention time period ranging from an end of the raising of the target temperature to a release of the dispersion liquid. For example, in a case where the target temperature (foaming temperature) is lower, the DSC ratio tends to be larger, and in a case where the retention time period is longer, the DSC ratio also tends to be larger.

Thus, by conducting the above experiments with different target temperatures (foaming temperatures) and retention time periods so as to understand in advance a relation between the target temperature (foaming temperature) and the DSC ratio and a relation between the retention time period and the DSC ratio, it is possible to easily produce expanded polypropylene resin particles having a desired DSC ratio.

As described above, the present invention includes an in-mold foaming molded product having a thin wall part, and a method of producing the in-mold foaming molded product ([1] and [10] below), and further includes the following [2] through [9] and [11].

[1] An in-mold foaming molded product containing a thin wall part, each of the in-mold foaming molded product and the thin wall part including expanded polypropylene resin particles, the expanded polypropylene resin particles including a polypropylene resin composition that contains an aliphatic diethanolamine fatty acid ester and an aliphatic diethanolamine in a total amount of not less than 0.1 part by weight but not greater than 5 parts by weight with respect to 100 parts by weight of polypropylene resin.

[2] The in-mold foaming molded product as set forth in [1], wherein a weight proportion of the aliphatic diethanolamine fatty acid ester is not less than 5 weight % but not greater than 95 weight % with respect to 100 weight % of a total weight of the aliphatic diethanolamine fatty acid ester and the aliphatic diethanolamine.

[3] The in-mold foaming molded product as set forth in [1] or [2], wherein the aliphatic diethanolamine fatty acid ester is a compound represented by General Formula (1), and the aliphatic diethanolamine is a compound represented by General Formula (2),

[Chem. 41]

General Formula (1)

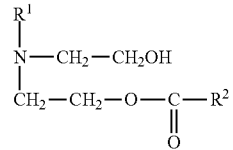

where $R^1$ is a C12 to C24 alkyl group, $R^2$ is a C11 to C23 alkyl group, and $R^1$ and $R^2$ are optionally identical to or different from each other,

[Chem. 5]

General Formula (2)

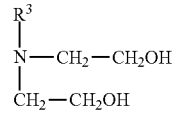

where $R^3$ is a C12 to C24 alkyl group.

[4] The in-mold foaming molded product as set forth in [3], wherein the aliphatic diethanolamine fatty acid ester is stearyl diethanolamine monostearic acid ester, and the aliphatic diethanolamine is stearyl diethanolamine.

[5] The in-mold foaming molded product as set forth in any one of [1] through [4], wherein the polypropylene resin composition further contains an aliphatic alcohol in an amount of not less than 0.001 part by weight but not greater than 2 parts by weight with respect to 100 parts by weight of the polypropylene resin.

[6] The in-mold foaming molded product as set forth in [5], wherein the aliphatic alcohol is a compound represented by General Formula (3),

[Chem. 6]

$$R^4-OH \qquad \text{General Formula (3)}$$

where $R^4$ is a C12 to C24 alkyl group.

[7] The in-mold foaming molded product as set forth in any one of [1] through [6], wherein a shortest distance between one point of one of a pair of surfaces and the other of the pair of surfaces which face each other on at least one portion of the thin wall part of the in-mold foaming molded product is a distance of not less than one expanded polypropylene resin particle but not more than three expanded polypropylene resin particles.

[8] The in-mold foaming molded product as set forth in any one of [1] through [7], wherein a shortest distance between one point of one of a pair of surfaces and the other of the pair of surfaces which face each other on at least one portion of the thin wall part of the in-mold foaming molded product is a distance of not less than one expanded polypropylene resin particle but not more than two expanded polypropylene resin particles.

[9] The in-mold foaming molded product as set forth in any one of [1] through [8], wherein the in-mold foaming molded product having the thin wall part is configured to house an article in each section partitioned by a rib or ribs which is/are the thin wall part.

[10] A method of producing an in-mold foaming molded product having a thin wall part,
the method including the steps of:
 filling a mold with expanded polypropylene resin particles; and
 heating the expanded polypropylene resin particles in the mold,
 the expanded polypropylene resin particles including a polypropylene resin composition that contains an aliphatic diethanolamine fatty acid ester and an aliphatic diethanolamine in a total amount of not less than 0.1 part by weight but not greater than 5 parts by weight with respect to 100 parts by weight of polypropylene resin.

[11] The method as set forth in [10], wherein the polypropylene resin composition further contains an aliphatic alcohol in an amount of not less than 0.001 part by weight but not greater than 2 parts by weight with respect to 100 parts by weight of the polypropylene resin.

EXAMPLES

Next, the present invention is described with reference to Examples and Comparative Examples. It should be noted, however, that the present invention is not limited to the Examples below.

The Examples and Comparative Examples used the following polypropylene resins and additives.

(1) Polypropylene Resins
 Polypropylene resin A (F227A available from Prime Polymer Co., Ltd.): An ethylene/propylene random copolymer having a melting point of 143° C., an ethylene content of 3.6 weight %, and an MI of 7.0 g/10 minutes
 Polypropylene resin B (E314M available from Prime Polymer Co., Ltd.): An ethylene/butene-1/propylene random copolymer having a melting point of 145° C., an ethylene content of 3 weight %, a butene-1 content of 1.5 weight %, and an MI of 5.0 g/10 minutes
(2) Aliphatic Diethanolamine Fatty Acid Ester
 Stearyl diethanolamine monostearic acid ester (Electrostripper TS-6B available from Kao Corporation)
(3) Aliphatic Diethanolamines
 Stearyl diethanolamine (reagent available from Tokyo Chemical Industry Co., Ltd.)
 Lauryl diethanolamine (reagent available from Wako Pure Chemical Industries, Ltd.)
(4) Aliphatic Alcohols
 Stearyl alcohol (reagent available from Wako Pure Chemical Industries, Ltd.)
 Lauryl alcohol (reagent available from Wako Pure Chemical Industries, Ltd.)
(5) Other Main Additives
 N-hydroxyethyl-N-[2-hydroxyalkyl]amine (Dusper 125B available from Miyoshi Oil & Fat Co., Ltd.)
 Glycerin stearic acid ester (Rikemal S-100 available from Riken Vitamin Co., Ltd.)
(6) Organic Pigment
 Perylene Red (available from Dainichiseika Colour & Chemicals Mfg. Co., Ltd.)
(7) Other Additives
 Polyethyleneglycol (PEG#300 available from Lion Corporation)
 Talc (Talcum Powder PK-S available from Hayashi-Kasei Co., Ltd.)
 Melamine (available from Nissan Chemical Industries, Ltd.)
(8) Foaming Agents
 Carbon dioxide (available from Air Water Inc.)
 Isobutane (available from Mitsui Chemicals, Inc.)

Evaluations in the Examples and Comparative Examples were carried out through the following method.

(Measurement of Melting Point of Polypropylene Resin)
A melting point of the polypropylene resin was measured with use of a differential scanning calorimeter DSC (model: DSC6200, available from Seiko Instruments Inc.) as a melting peak temperature on a DSC curve obtained by (i) raising a temperature of 5 to 6 mg of the polypropylene resin from 40° C. to 220° C. at a heating rate of 10° C./min so as to melt the polypropylene resin, (ii) lowering the temperature from 220° C. to 40° C. at a cooling rate of 10° C./min so as to crystallize the polypropylene resin, and then (iii) raising the temperature from 40° C. to 220° C. at the heating rate of 10° C./min again. In other words, the melting point of the polypropylene resin was measured as a melting peak temperature in a second temperature rise.

(Average Particle Diameter of Expanded Polypropylene Resin Particles)
Expanded polypropylene resin particles obtained in the present Examples had a substantially spherical shape. Therefore, a diameter of the expanded polypropylene resin particles was measured by use of a vernier caliper. An arithmetic average value of 20 expanded polypropylene resin particles was employed as an average particle diameter of the expanded polypropylene resin particles.

(Expanding Ratio of Expanded Polypropylene Resin Particles)

A weight w (g) and ethanol submergence volume v (cm$^3$) of the expanded polypropylene resin particles having a bulk volume of approximately 50 cm$^3$ were measured. An expanding ratio was calculated by an expression below from a density d (g/cm$^3$) of a polypropylene resin composition before being foamed. The density d of the polypropylene resin composition was 0.9 g/cm$^3$.

$$\text{Expanding ratio of expanded polypropylene resin particles} = d \times v/w$$

(Bulk Density of Expanded Polypropylene Resin Particles)

The expanded polypropylene resin particles were introduced gently into a wide-mouthed 10-liter container until the container was overflowed with the expanded polypropylene resin particles. The expanded polypropylene resin particles were then struck at the mouth of the 10-L container so as to leave 10 liter of the expanded polypropylene resin particles in the 10-liter container. The expanded polypropylene resin particles in the 10-L container were weighed, and a measured value was divided by the capacity value of 10 liter so as to express in a unit of g/L.

(DSC Ratio of Expanded Polypropylene Resin Particles)

A DSC curve was obtained with use of a differential scanning calorimeter DSC (model: DSC6200, available from Seiko Instruments Inc.) by raising a temperature of 5 to 6 mg of the expanded polypropylene resin particles from 40° C. to 220° C. at a heating rate of 10° C./min. The DSC curve had two melting peaks. With (i) Ql being a quantity of heat (J/g) at the melting peak based on a melting point on a low temperature side and (ii) Qh being a quantity of heat (J/g) at the melting peak based on a melting point on a high temperature side, calculation of a DSC ratio, i.e., a ratio of (i) the quantity of heat at the melting peak based on the melting point on the high temperature side to (ii) a total quantity of heat at the two melting peaks is carried out by (Qh/(Ql+Qh))×100(%).

(Shape of in-Mold Foaming Molded Product to be Evaluated)

A box-shaped in-mold foaming molded product having one rib having a surface a and a surface b (see FIG. 8) was produced by performing in-mold foaming molding with use of a polyolefin foam molding machine P150N (manufactured by Toyo Machinery & Metal Co., Ltd.). Note that the box-shaped in-mold foaming molded product had (i) an external dimension of 200 mm in length, 210 mm in width, and 150 mm in height and (ii) a uniform thickness of 15 mm. The rib having the surfaces a and b was placed in a center of a bottom part of the box-shaped in-mold foaming molded product. The rib had an external dimension of 50 mm in length, 7 mm in width, and 120 mm in height. The rib having the surfaces a and b was evaluated in terms of the following matters.

(Surface Appearance of Thin Wall Part of In-Mold Foaming Molded Product)

[Convexoconcave of Surface]

The surface b of the rib having the surfaces a and b was visually observed, and evaluated according to the following criteria.

G (Good): Hardly any gaps were found among expanded polypropylene resin particles.

A (Adequate): Some gaps were found among expanded polypropylene resin particles.

P (Poor): Many gaps were found among expanded polypropylene resin particles.

[Appearance of Ridge Line]

A ridge line part where the surfaces a and b intersect with each other was visually observed, and evaluated according to the following criteria.

G (Good): The ridge line part had a sharp, smooth, and straight ridge line, and a satisfactory mold-shape transfer property. Moreover, even in a case where the ridge line part was rubbed with a finger five times, expanded polypropylene resin particles of the ridge line part did not peel off.

A (Adequate): The ridge line part had a slightly round and small concavoconvex ridge line. However, even in a case where the ridge line part was rubbed with a finger five times, the expanded polypropylene resin particles of the ridge line part did not peel off.

P (Poor): The ridge line part clearly had a concavoconvex ridge line and a poor mold-shape transfer property. In a case where the ridge line part was rubbed with a finger five times, the expanded polypropylene resin particles of the ridge line part peeled off within the five times.

Examples 1 Through 18 and Comparative Examples 1 Through 7

Preparation of Polypropylene Resin Particles

Each mixture was prepared by mixing a polypropylene resin and additives of kinds and amounts shown in Table 1 or 2 and 0.01 part by weight of the organic pigment Perylene Red together. The each mixture was (i) melt-kneaded in a single-screw extruder having a diameter of 50 mm (resin temperature of 210° C.), (ii) extruded from an end of the single-screw extruder into a strand shape, and (iii) granulated by cutting the extruded in the strand shape. This produced polypropylene resin particles (1.2 mg per particle).

Note that the mixture of Comparative Example 7 was not stably extruded, and therefore an amount of a melted resin to be extruded from the end of the single-screw extruder varied. This prepared polypropylene resin particles which were different in weight from one another. No subsequent step was carried out in Comparative Example 7.

[Preparation of Expanded Polypropylene Resin Particles]

Into a 10-L pressure-resistant vessel fed were (i) 300 parts by weight of water, (ii) 100 parts by weight of the polypropylene resin particles produced, (iii) 0.8 part by weight of tertiary calcium phosphate serving as a dispersion agent, and (iv) 0.03 part by weight of sodium normal paraffin sulfonate serving as a dispersion auxiliary agent. Further, a foaming agent of a kind and amount shown in Table 1 or 2 was fed into the pressure-resistant vessel. A resulting mixture was, under stirring, retained in the pressure-resistant vessel for 30 minutes at a foaming temperature (temperature inside the vessel) and a foaming pressure (pressure inside the vessel) which are shown in Table 1 or 2. Next, while the pressure inside the pressure-resistant vessel was maintained at the foaming pressure with use of a gaseous material that was identical in kind to the foaming agent used, a dispersion liquid was released through an orifice into atmospheric pressure, the orifice having a diameter of 3 mm and being provided at a lower portion of the pressure-resistant vessel. This operation produced first-stage expanded particles having a substantially spherical shape. The first-stage expanded particles were then dried at 75° C. for 24 hours.

Note that in Example 12, the dispersion liquid in the pressure-resistant vessel had an unstable dispersibility, and some particles of the first-stage expanded particles adhered to each other. Therefore, after being dried, the first-stage expanded particles were sieved so that the particles which adhered to each other were removed.

[Preparation of Polypropylene Resin in-Mold Foaming Molded Product]

Figure 8:
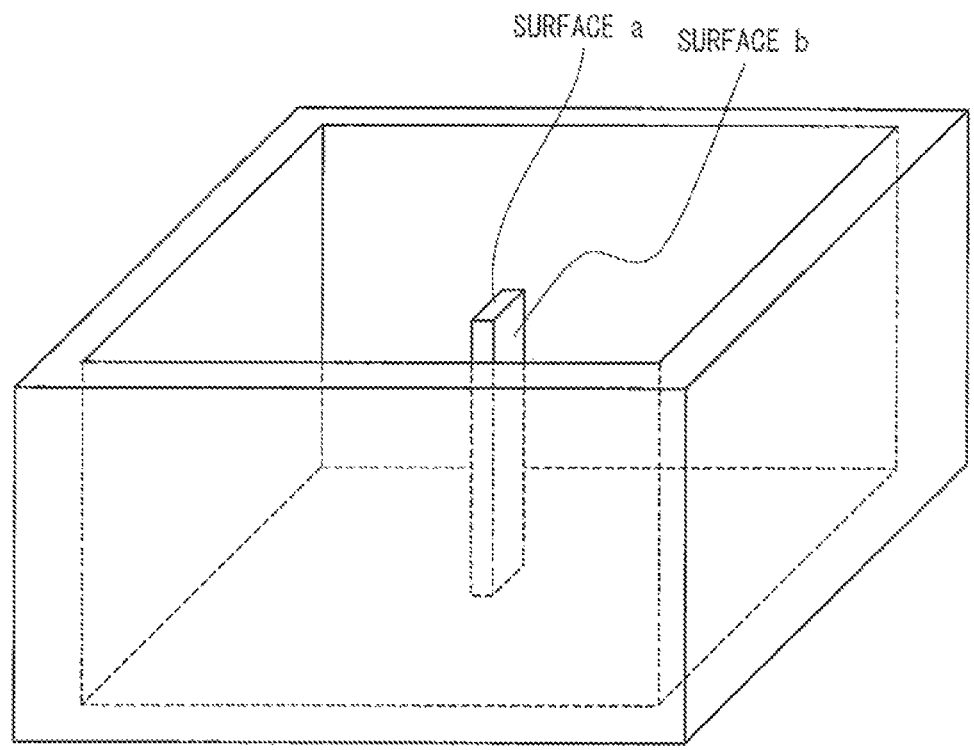
FIG. 8 illustrates a polypropylene resin in-mold foaming molded product having a thin wall part of Examples and Comparative Examples of the present invention.

Next, the first-stage expanded particles filled a mold which molded a box-shaped in-mold foaming molded product having one rib illustrated in FIG. 8 with no internal pressure applied to the first-stage expanded particles. The mold was heated with use of steam so as to fuse the first-stage expanded particles with one another. This operation produced the in-mold foaming molded product. The in-mold foaming molded product was then taken out from the mold. The steam pressure used in this operation had a value shown in Table 1 or 2 (molding condition).

The in-mold foaming molded product taken out from the mold was dried and cured for 24 hours in a drier having a temperature of 70° C. Then, evaluation was carried out for surface appearance of a thin wall part (that is the rib) having an external dimension of 50 mm in length, 7 mm in width, and 120 mm in height. Results of the evaluation are shown in Table 1 or 2.

Reference Example 1

Reference Example 1 was totally identical to Comparative Example 1 except that Reference Example 1 employed a mold which molded a rib having an external dimension of 50 mm in length, 15 mm in width, and 120 mm in height. Evaluation was carried out for surface appearance of a part (that is the rib) having an external dimension of 50 mm in length, 15 mm in width, and 120 mm in height. A result of the evaluation is shown in Table 2.

TABLE 1

| | | | | Examples | | | | | |
|---|---|---|---|---|---|---|---|---|---|
| | | | | 1 | 2 | 3 | 4 | 5 | 6 |
| | Polypropylene resin A | | PBW | 100 | 100 | 100 | 100 | 100 | 100 |
| | Polypropylene resin B | | PBW | | | | | | |
| Aliphatic diethanolamine fatty acid ester | Stearyl diethanolamine monostearic acid ester | | PBW | 0.15 | 1.5 | 0.09 | 0.6 | 0.6 | 0.6 |
| Aliphatic diethanolamine | Stearyl diethanolamine | | PBW | 0.1 | 1 | 0.06 | 0.4 | 0.4 | |
| | Lauryl diethanolamine | | PBW | | | | | | 0.4 |
| Aliphatic alcohol | Stearyl alcohol | | PBW | | | | | | |
| | Lauryl alcohol | | PBW | | | | | | |
| Other main additives | N-hydroxyethyl-N-[2-hydroxyalkyl]amine | | PBW | | | | | | |
| | Glycerin stearic acid ester | | PBW | | | | | | |
| Other additives | Polyethyleneglycol | | PBW | 0.2 | 0.2 | 0.2 | 0.2 | 0.2 | 0.2 |
| | Talc | | PBW | 0.15 | 0.15 | 0.15 | 0.15 | 0.15 | 0.15 |
| | Melamine | | PBW | | | | | | |
| Expanded polypropylene resin particles | First-stage foaming condition | Carbon dioxide amount | PBW | 5.0 | 5.0 | 5.0 | 5.0 | 5.0 | 5.0 |
| | | Isobutane | PBW | — | — | — | — | — | — |
| | | Foaming temperature | ° C. | 147.5 | 145.8 | 147.5 | 146.2 | 146.2 | 146.3 |
| | | Foaming P (gage P) | MPa | 2.5 | 2.3 | 2.5 | 2.4 | 2.4 | 2.3 |
| | First-stage expanded particles | Expanding ratio | times | 12 | 11 | 11 | 10 | 10 | 10 |
| | | Bulk density | g/L | 54 | 56 | 54 | 59 | 59 | 58 |
| | | DSC Ratio | % | 24 | 25 | 24 | 25 | 25 | 24 |
| | | Average particle diameter | mm | 2.8 | 2.8 | 2.8 | 2.9 | 2.9 | 2.8 |
| | Second-stage foaming condition | EP internal P (absolute P) | Mpa | — | — | — | — | — | — |
| | | Steam P (gage P) | MPa | — | — | — | — | — | — |
| | Second-stage expanded particles | Bulk density | g/L | — | — | — | — | — | — |
| | | Average particle diameter | mm | — | — | — | — | — | — |
| Polypropylene resin in-mold expanded molded product | Molding conditions | EP internal P (absolute P) | MPa | — | — | — | — | — | — |
| | | Steam P (gage P) | MPa | 0.30 | 0.30 | 0.30 | 0.30 | 0.28 | 0.30 |
| | The number of EPs in shortest distance between surface b of rib and surface facing surface b | | Number of EPs | 3 | 3 | 3 | 3 | 3 | 3 |
| | Surface appearance of thin wall part | Convexoconcave of surface | — | G | G | A | G | G | G |
| | | Appearance of ridge line | — | A | G | A | G | A | G |

| | | | | Examples | | | | | |
|---|---|---|---|---|---|---|---|---|---|
| | | | | 7 | 8 | 9 | 10 | 11 | 12* |
| | Polypropylene resin A | | PBW | 100 | 100 | 100 | 100 | 100 | 100 |
| | Polypropylene resin B | | PBW | | | | | | |
| Aliphatic diethanolamine fatty acid ester | Stearyl diethanolamine monostearic acid ester | | PBW | 0.15 | 0.9 | 0.4 | 0.3 | 0.97 | 2 |
| Aliphatic diethanolamine | Stearyl diethanolamine | | PBW | 0.1 | 0.1 | 0.6 | 0.7 | 0.03 | 3 |
| | Lauryl diethanolamine | | PBW | | | | | | |
| Aliphatic alcohol | Stearyl alcohol | | PBW | | | | | | |
| | Lauryl alcohol | | PBW | | | | | | |
| Other main additives | N-hydroxyethyl-N-[2-hydroxyalkyl]amine | | PBW | | | | | | |
| | Glycerin stearic acid ester | | PBW | 0.5 | | | | | |
| Other additives | Polyethyleneglycol | | PBW | 0.2 | 0.2 | 0.2 | 0.2 | 0.2 | 0.2 |
| | Talc | | PBW | 0.15 | 0.15 | 0.15 | 0.15 | 0.15 | 0.15 |
| | Melamine | | PBW | | | | | | |

TABLE 1-continued

| | | | | | | | | | |
|---|---|---|---|---|---|---|---|---|---|
| Expanded polypropylene resin particles | First-stage foaming condition | Carbon dioxide amount | PBW | 5.0 | 5.0 | 5.0 | 5.0 | 5.0 | 5.0 |
| | | Isobutane | PBW | — | — | — | — | — | — |
| | | Foaming temperature | ° C. | 147.2 | 146.2 | 146.0 | 145.9 | 146.8 | 144.9 |
| | | Foaming P (gage P) | MPa | 2.3 | 2.4 | 2.4 | 2.4 | 2.4 | 2.3 |
| | First-stage expanded particles | Expanding ratio | times | 10 | 10 | 11 | 11 | 11 | 11 |
| | | Bulk density | g/L | 59 | 60 | 57 | 56 | 59 | 56 |
| | | DSC Ratio | % | 24 | 24 | 25 | 25 | 24 | 22 |
| | | Average particle diameter | mm | 2.8 | 2.8 | 2.7 | 2.8 | 2.8 | 2.8 |
| | Second-stage foaming condition | EP internal P (absolute P) | MPa | — | — | — | — | — | — |
| | | Steam P (gage P) | MPa | — | — | — | — | — | — |
| | Second-stage expanded particles | Bulk density | g/L | — | — | — | — | — | — |
| | | Average particle diameter | mm | — | — | — | — | — | — |
| Polypropylene resin in-mold expanded molded product | Molding conditions | EP internal P (absolute P) | MPa | — | — | — | — | — | — |
| | | Steam P (gage P) | MPa | 0.30 | 0.30 | 0.30 | 0.30 | 0.30 | 0.28 |
| | The number of EPs in shortest distance between surface b of rib and surface facing surface b | | Number of EPs | 3 | 3 | 3 | 3 | 3 | 3 |
| | Surface appearance of thin wall part | Convexoconcave of surface | — | G | G | G | A | G | G |
| | | Appearance of ridge line | — | A | G | G | G | A | G |

| | | | | Examples | | | | | |
|---|---|---|---|---|---|---|---|---|---|
| | | | | 13 | 14 | 15 | 16 | 17 | 18 |
| | Polypropylene resin A | | PBW | | 100 | 100 | 100 | 100 | 100 |
| | Polypropylene resin B | | PBW | 100 | | | | | |
| Aliphatic diethanolamine fatty acid ester | Stearyl diethanolamine monostearic acid ester | | PBW | 0.6 | 0.6 | 0.6 | 0.6 | 0.6 | 0.6 |
| Aliphatic diethanolamine | Stearyl diethanolamine | | PBW | 0.4 | 0.4 | 0.4 | 0.4 | 0.4 | 0.4 |
| | Lauryl diethanolamine | | PBW | | | | | | |
| Aliphatic alcohol | Stearyl alcohol | | PBW | | 0.001 | 0.01 | 1 | 3 | |
| | Lauryl alcohol | | PBW | | | | | | 0.01 |
| Other main additives | N-hydroxyethyl-N-[2-hydroxyalkyl]amine | | PBW | | | | | | |
| | Glycerin stearic acid ester | | PBW | | | | | | |
| Other additives | Polyethyleneglycol | | PBW | 0.2 | 0.2 | 0.2 | 0.2 | 0.2 | 0.2 |
| | Talc | | PBW | 0.15 | 0.15 | 0.15 | 0.15 | 0.15 | 0.15 |
| | Melamine | | PBW | | | | | | |
| Expanded polypropylene resin particles | First-stage foaming condition | Carbon dioxide amount | PBW | 5.0 | 5.0 | 5.0 | 5.0 | 5.0 | 5.0 |
| | | Isobutane | PBW | — | — | — | — | — | — |
| | | Foaming temperature | ° C. | 147.0 | 146.1 | 145.9 | 145.8 | 145.8 | 146.0 |
| | | Foaming P (gage P) | MPa | 2.5 | 2.4 | 2.3 | 2.3 | 2.3 | 2.3 |
| | First-stage expanded particles | Expanding ratio | times | 12 | 11 | 10 | 11 | 11 | 11 |
| | | Bulk density | g/L | 57 | 58 | 60 | 56 | 54 | 58 |
| | | DSC Ratio | % | 24 | 24 | 25 | 25 | 25 | 25 |
| | | Average particle diameter | mm | 2.8 | 2.8 | 2.8 | 2.7 | 2.8 | 2.8 |
| | Second-stage foaming condition | EP internal P (absolute P) | MPa | — | — | — | — | — | — |
| | | Steam P (gage P) | MPa | — | — | — | — | — | — |
| | Second-stage expanded particles | Bulk density | g/L | — | — | — | — | — | — |
| | | Average particle diameter | mm | — | — | — | — | — | — |
| Polypropylene resin in-mold expanded molded product | Molding conditions | EP internal P (absolute P) | MPa | — | — | — | — | — | — |
| | | Steam P (gage P) | MPa | 0.28 | 0.29 | 0.28 | 0.28 | 0.28 | 0.28 |
| | The number of EPs in shortest distance between surface b of rib and surface facing surface b | | Number of EPs | 3 | 3 | 3 | 3 | 3 | 3 |
| | Surface appearance of thin wall part | Convexoconcave of surface | — | G | G | G | G | G | G |
| | | Appearance of ridge line | — | G | G | G | G | G | G |

"EP" stands for "expanded particle".
"PBW" stands for "part(s) by weight".
"P" stands for "pressure".
*The first-stage expanded particles obtained in Example 12 included particles adhering to each other. Therefore, the first-stage expanded particles were sieved so as to remove the particles, and then an in-mold foaming molded product of the first-stage expanded particles was produced.

TABLE 2

| | | | Comparative Examples | | | | | | | RE |
|---|---|---|---|---|---|---|---|---|---|---|
| | | | 1 | 2 | 3 | 4 | 5 | 6 | 7 | 1 |
| | Polypropylene resin A | PBW | 100 | 100 | 100 | 100 | 100 | 100 | 100 | 100 |
| | Polypropylene resin B | PBW | | | | | | | | |
| Aliphatic diethanolamine fatty acid ester | Stearyl diethanolamine monostearic acid ester | PBW | | 0.6 | | 0.03 | 1 | | 3 | |
| Aliphatic diethanolamine | Stearyl diethanolamine | PBW | | | 0.6 | 0.02 | | 1 | 3 | |
| | Lauryl diethanolamine | PBW | | | | | | | | |
| Aliphatic alcohol | Stearyl alcohol | PBW | | | | | | | | |
| | Lauryl alcohol | PBW | | | | | | | | |

TABLE 2-continued

|  |  |  | | Comparative Examples | | | | | | | RE |
|---|---|---|---|---|---|---|---|---|---|---|---|
|  |  |  |  | 1 | 2 | 3 | 4 | 5 | 6 | 7 | 1 |
| Other main additives | N-hydroxyethyl-N-[2-hydroxyalkyl]amine | | PBW | | | | | | | | |
|  | Glycerin stearic acid ester | | PBW | 1.2 | 0.4 | 0.4 | | | | | 1.2 |
| Other additives | Polyethyleneglycol | | PBW | 0.2 | 0.2 | 0.2 | 0.2 | 0.2 | 0.2 | 0.2 | 0.2 |
|  | Talc | | PBW | 0.15 | 0.15 | 0.15 | 0.15 | 0.15 | 0.15 | 0.15 | 0.15 |
|  | Melamine | | PBW | | | | | | | | |
| Expanded polypropylene resin particles | First-stage foaming condition | Carbon dioxide amount | PBW | 5.0 | 4.0 | 4.0 | 5.0 | 5.0 | 5.0 | Canceled because no stable extrusion was possible during production of polypropylene resin particles | 5.0 |
|  |  | Isobutane | PBW | — | — | — | — | — | — |  | — |
|  |  | Foaming temperature | °C. | 148.4 | 147.2 | 147.1 | 148.0 | 147.1 | 146.9 |  | 148.4 |
|  |  | Foaming P (gage P) | MPa | 2.4 | 2.4 | 2.4 | 2.4 | 2.3 | 2.3 |  | 2.4 |
|  | First-stage expanded particles | Expanding ratio | times | 11 | 10 | 11 | 11 | 11 | 12 |  | 11 |
|  |  | Bulk density | g/L | 51 | 57 | 56 | 56 | 53 | 51 |  | 51 |
|  |  | DSC Ratio | % | 23 | 24 | 24 | 23 | 24 | 24 |  | 23 |
|  |  | Average particle diameter | mm | 2.8 | 2.8 | 2.8 | 2.8 | 2.8 | 2.8 |  | 2.8 |
|  | Second-stage foaming condition | EP internal P (absolute P) | MPa | — | — | — | — | — | — |  | — |
|  |  | Steam P (gage P) | MPa | — | — | — | — | — | — |  | — |
|  | Second-stage expanded particles | Bulk density | g/L | — | — | — | — | — | — |  | — |
|  |  | Average particle diameter | mm | — | — | — | — | — | — |  | — |
| Polypropylene resin in-mold expanded molded product | Molding conditions | EP internal P (absolute P) | MPa | — | — | — | — | — | — |  | — |
|  |  | Steam pr. (gage P) | MPa | 0.30 | 0.30 | 0.30 | 0.30 | 0.30 | 0.30 |  | 0.30 |
|  | The number of EPs in shortest distance between surface b of rib and surface facing surface b | | Number of EPs | 3 | 3 | 3 | 3 | 3 | 3 |  | 5 |
|  | Surface appearance of thin wall part | Convexoconcave of surface | — | P | A | P | P | A | P |  | G |
|  |  | Appearance of ridge line | — | P | P | P | P | P | P |  | G |

"RE" stands for Reference Example.

Examples 19 Through 28 and Comparative Examples 8 and 9

Preparation of Polypropylene Resin Particles

Each mixture was prepared by mixing a polypropylene resin and additives of kinds and amounts shown in Table 3 or 4 and 0.01 part by weight of the organic pigment Perylene Red together. The each mixture was (i) kneaded in an extruder having a diameter of 50 mm (resin temperature of 210° C.), (ii) extruded from an end of the extruder into a strand shape, and (iii) granulated by cutting the extruded in the strand shape. This produced polypropylene resin particles (1.2 mg per particle).

[Preparation of Expanded Polypropylene Resin Particles]

Into a 10-L pressure-resistant vessel were fed (i) 300 parts by weight of water, (ii) 100 parts by weight of the polypropylene resin particles produced, (iii) 0.8 part by weight of tertiary calcium phosphate serving as a dispersion agent, and (iv) 0.03 part by weight of sodium normal paraffin sulfonate serving as a dispersion auxiliary agent. Further, a foaming agent of a kind and amount shown in Table 3 or 4 was fed into the pressure-resistant vessel. A resulting mixture was, under stirring, retained in the pressure-resistant vessel for 30 minutes at a foaming temperature (temperature inside the vessel) and a foaming pressure (pressure inside the vessel) which are shown in Table 3 or 4. Next, while the pressure inside the pressure-resistant vessel was maintained at the foaming pressure with use of a gaseous material that was identical in kind to the foaming agent used, a dispersion liquid was released through an orifice into atmospheric pressure, the orifice having a diameter of 3 mm and being provided at a lower portion of the pressure-resistant vessel. This operation produced first-stage expanded particles having a substantially spherical shape. The first-stage expanded particles were then dried at 75° C. for 24 hours.

The first-stage expanded particles were fed into a 1-m³ pressure-resistant vessel, and inside of the pressure-resistant vessel was pressurized with air so as to apply to the first-stage expanded particles an internal pressure higher than atmospheric pressure. The first-stage expanded particles to which the internal pressure was applied were transferred to a second-stage foaming device, and then heated with use of steam to further foam the first-stage expanded particles so as to produce second-stage expanded particles having a substantially spherical shape. During this operation, an expanded particle internal pressure and a steam pressure had respective values shown in Table 3 or 4 (second-stage foaming condition).

[Preparation of Polypropylene Resin In-mold Foaming Molded Product]

Next, the second-stage expanded particles produced were fed into a 1-m³ pressure-resistant vessel, and inside of the pressure-resistant vessel was pressurized with air so as to apply to the second-stage expanded particles an internal pressure higher than atmospheric pressure. Then, the second-stage expanded particles filled a mold which molded a box-shaped in-mold foaming molded product having one rib illustrated in FIG. 8. The mold was heated with use of steam so as to fuse the second-stage expanded particles with one another. This operation produced the in-mold foaming molded product. The in-mold foaming molded product was then taken out from the mold. During this operation, an expanded particle internal pressure and a steam pressure had respective values shown in Table 3 or 4 (molding condition). The in-mold foaming molded product taken out from the mold was dried and cured for 24 hours in a drier having a temperature of 70° C. Then, evaluation was carried out for surface appearance of a thin wall part (that is the rib) having an external dimension of 50 mm in length, 7 mm in width, and 120 mm in height. Results of the evaluation are shown in Table 3 or 4.

TABLE 3

|  |  |  |  | Examples |  |  |  |  |
|---|---|---|---|---|---|---|---|---|
|  |  |  |  | 19 | 20 | 21 | 22 | 23 |
|  | Polypropylene resin A |  | PBW | 100 | 100 | 100 | 100 | 100 |
|  | Polypropylene resin B |  | PBW |  |  |  |  |  |
| Aliphatic diethanolamine fatty acid ester | Stearyl diethanolamine monostearic acid ester |  | PBW | 0.15 | 1.5 | 0.6 | 0.6 | 0.9 |
| Aliphatic diethanolamine | Stearyl diethanolamine |  | PBW | 0.1 | 1 | 0.4 |  | 0.1 |
|  | Lauryl diethanolamine |  | PBW |  |  |  | 0.4 |  |
| Aliphatic alcohol | Stearyl alcohol |  | PBW |  |  |  |  |  |
|  | Lauryl alcohol |  | PBW |  |  |  |  |  |
| Other main additives | N-hydroxyethyl-N-[2-hydroxyalkyl]amine |  | PBW |  |  |  |  |  |
|  | Glycerin stearic acid ester |  | PBW |  |  |  |  |  |
| Other additives | Polyethyleneglycol |  | PBW | 0.2 | 0.2 | 0.2 | 0.2 | 0.2 |
|  | Talc |  | PBW | 0.15 | 0.15 | 0.15 | 0.15 | 0.15 |
|  | Melamine |  | PBW |  |  |  |  |  |
| Expanded polypropylene resin particles | First-stage foaming condition | Carbon dioxide amount | PBW | 5.0 | 5.0 | 5.0 | 5.0 | 5.0 |
|  |  | Isobutane | PBW | — | — | — | — | — |
|  |  | Foaming temperature | ° C. | 147.5 | 145.8 | 146.2 | 146.3 | 146.2 |
|  |  | Foaming P (gage P) | MPa | 2.5 | 2.3 | 2.4 | 2.3 | 2.4 |
|  | First-stage expanded particles | Expanding ratio | times | 12 | 11 | 10 | 10 | 10 |
|  |  | Bulk density | g/L | 54 | 56 | 59 | 58 | 60 |
|  |  | DSC Ratio | % | 24 | 25 | 24 | 24 | 24 |
|  |  | Average particle diameter | mm | 2.8 | 2.8 | 2.9 | 2.8 | 2.8 |
|  | Second-stage foaming condition | EP internal P (absolute P) | MPa | 0.30 | 0.30 | 0.30 | 0.30 | 0.30 |
|  |  | Steam P (gage P) | MPa | 0.07 | 0.05 | 0.08 | 0.07 | 0.08 |
|  | Second-stage expanded particles | Bulk density | g/L | 30 | 27 | 28 | 27 | 29 |
|  |  | Average particle diameter | mm | 3.5 | 3.5 | 3.6 | 3.6 | 3.5 |
| Polypropylene resin in-mold expanded molded product | Molding conditions | EP internal P (absolute P) | MPa | 0.20 | 0.20 | 0.20 | 0.20 | 0.20 |
|  |  | Steam P (gage P) | MPa | 0.30 | 0.30 | 0.30 | 0.30 | 0.30 |
|  | The number of EPs in shortest distance between surface b of rib and surface facing surface b |  | Number of EPs | 2 | 2 | 2 | 2 | 2 |
|  | Surface appearance of thin wall part | Convexoconcave of surface | — | G | G | G | G | G |
|  |  | Appearance of ridge line | — | A | G | G | G | G |

|  |  |  |  | Examples |  |  |  |  |
|---|---|---|---|---|---|---|---|---|
|  |  |  |  | 24 | 25 | 26 | 27 | 28 |
|  | Polypropylene resin A |  | PBW | 100 | 100 | 100 | 100 | 100 |
|  | Polypropylene resin B |  | PBW |  |  |  |  |  |
| Aliphatic diethanolamine fatty acid ester | Stearyl diethanolamine monostearic acid ester |  | PBW | 0.4 | 0.6 | 0.6 | 0.6 | 0.6 |
| Aliphatic diethanolamine | Stearyl diethanolamine |  | PBW | 0.6 | 0.4 | 0.4 | 0.4 | 0.4 |
|  | Lauryl diethanolamine |  | PBW |  |  |  |  |  |
| Aliphatic alcohol | Stearyl alcohol |  | PBW |  | 0.001 | 0.01 | 1 |  |
|  | Lauryl alcohol |  | PBW |  |  |  |  | 0.01 |
| Other main additives | N-hydroxyethyl-N-[2-hydroxyalkyl]amine |  | PBW |  |  |  |  |  |
|  | Glycerin stearic acid ester |  | PBW |  |  |  |  |  |
| Other additives | Polyethyleneglycol |  | PBW | 0.2 | 0.2 | 0.2 | 0.2 | 0.2 |
|  | Talc |  | PBW | 0.15 | 0.15 | 0.15 | 0.15 | 0.15 |
|  | Melamine |  | PBW |  |  |  |  |  |
| Expanded polypropylene resin particles | First-stage foaming condition | Carbon dioxide amount | PBW | 5.0 | 5.0 | 5.0 | 5.0 | 5.0 |
|  |  | Isobutane | PBW | — | — | — | — | — |
|  |  | Foaming temperature | ° C. | 146.0 | 146.1 | 145.9 | 145.8 | 146.0 |
|  |  | Foaming P (gage P) | MPa | 2.4 | 2.4 | 2.3 | 2.3 | 2.3 |
|  | First-stage expanded particles | Expanding ratio | times | 11 | 11 | 10 | 11 | 11 |
|  |  | Bulk density | g/L | 57 | 58 | 60 | 56 | 58 |
|  |  | DSC Ratio | % | 25 | 24 | 25 | 25 | 25 |
|  |  | Average particle diameter | mm | 2.7 | 2.8 | 2.8 | 2.7 | 2.8 |
|  | Second-stage foaming condition | EP internal P (absolute P) | MPa | 0.30 | 0.30 | 0.30 | 0.30 | 0.30 |
|  |  | Steam P (gage P) | MPa | 0.05 | 0.07 | 0.08 | 0.04 | 0.06 |
|  | Second-stage expanded particles | Bulk density | g/L | 30 | 27 | 28 | 28 | 30 |
|  |  | Average particle diameter | mm | 3.5 | 3.5 | 3.5 | 3.5 | 3.5 |
| Polypropylene resin | Molding conditions | EP internal P (absolute P) | MPa | 0.20 | 0.20 | 0.20 | 0.20 | 0.20 |
|  |  | Steam P (gage P) | MPa | 0.30 | 0.29 | 0.28 | 0.28 | 0.28 |

TABLE 3-continued

| | | | | | | | |
|---|---|---|---|---|---|---|---|
| in-mold expanded molded product | The number of EPs in shortest distance between surface b of rib and surface facing surface b | Number of EPs | 2 | 2 | 2 | 2 | 2 |
| | Surface appearance of thin wall part | Convexoconcave of surface | — | G | G | G | G | G |
| | | Appearance of ridge line | — | G | G | G | G | G |

TABLE 4

| | | | | Comparative Examples | |
|---|---|---|---|---|---|
| | | | | 8 | 9 |
| | Polypropylene resin A | | PBW | 100 | 100 |
| | Polypropylene resin B | | PBW | | |
| Aliphatic diethanolamine fatty acid ester | Stearyl diethanolamine monostearic acid ester | | PBW | | 0.03 |
| Aliphatic diethanolamine | Stearyl diethanolamine | | PBW | | 0.02 |
| | Lauryl diethanolamine | | PBW | | |
| Aliphatic alcohol | Stearyl alcohol | | PBW | | |
| | Lauryl alcohol | | PBW | | |
| Other main additives | N-hydroxyethyl-N-[2-hydroxyalkyl]amine | | PBW | | |
| | Glycerin stearic acid ester | | PBW | 1.2 | |
| Other additives | Polyethyleneglycol | | PBW | 0.2 | 0.2 |
| | Talc | | PBW | 0.15 | 0.15 |
| | Melamine | | PBW | | |
| Expanded polypropylene resin particles | First-stage foaming condition | Carbon dioxide amount | PBW | 5.0 | 5.0 |
| | | Isobutane | PBW | — | — |
| | | Foaming temperature | °C. | 148.4 | 148.0 |
| | | Foaming P (gage P) | MPa | 2.4 | 2.4 |
| | First-stage expanded particles | Expanding ratio | times | 11 | 11 |
| | | Bulk density | g/L | 51 | 56 |
| | | DSC Ratio | % | 23 | 23 |
| | | Average particle diameter | mm | 2.8 | 2.8 |
| | Second-stage foaming condition | EP internal P (absolute P) | MPa | 0.30 | 0.30 |
| | | Steam P (gage P) | MPa | 0.08 | 0.07 |
| | Second-stage expanded particles | Bulk density | g/L | 29 | 31 |
| | | Average particle diameter | mm | 3.6 | 3.5 |
| Polypropylene resin in-mold expanded molded product | Molding conditions | EP internal P (absolute P) | MPa | 0.20 | 0.20 |
| | | Steam P (gage P) | MPa | 0.30 | 0.30 |
| | The number of EPs in shortest distance between surface b of rib and surface facing surface b | | Number of EPs | 2 | 2 |
| | Surface appearance of thin wall part | Convexoconcave of surface | — | A | P |
| | | Appearance of ridge line | — | P | P |

Example 29 and Comparative Example 10

Preparation of Polypropylene Resin Particles

Each mixture was prepared by mixing a polypropylene resin and additives of kinds and amounts shown in Table 5 and 0.01 part by weight of the organic pigment Perylene Red together. The each mixture was (i) kneaded in an extruder having a diameter of 50 mm (resin temperature of 210° C.), (ii) extruded from an end of the extruder into a strand shape, and (iii) granulated by cutting the extruded in the strand shape. This produced polypropylene resin particles (1.2 mg per particle).

[Preparation of Expanded Polypropylene Resin Particles]

Into a 10-L pressure-resistant vessel were fed (i) 300 parts by weight of water, (ii) 100 parts by weight of the polypropylene resin particles produced, (iii) 0.5 part by weight of tertiary calcium phosphate serving as a dispersion agent, and (iv) 0.02 part by weight of sodium normal paraffin sulfonate serving as a dispersion auxiliary agent. While a resulting mixture was stirred, a temperature of the pressure-resistant vessel was set to a foaming temperature (temperature inside the vessel) shown in Table 5, and inside of the pressure-resistant vessel was pressurized with air so as to have a foaming pressure (pressure inside the vessel) shown in Table 5. The mixture was then retained in that state for 30 minutes so as to hydrate. Next, while the pressure inside the pressure-resistant vessel was retained at the foaming pressure with use of air, a dispersion liquid was released through an orifice into a saturated steam pressure of 0.05 MPa-G, the orifice having a diameter of 3 mm and being provided at a lower portion of the pressure-resistant vessel. This operation produced first-stage expanded particles having a substantially spherical shape. The first-stage expanded particles were then dried at 75° C. for 24 hours.

The first-stage expanded particles were fed into a 1-m³ pressure-resistant vessel, and inside of the pressure-resistant vessel was pressurized with air so as to apply to the first-stage expanded particles an internal pressure higher than atmospheric pressure. The first-stage expanded particles to which the internal pressure was applied were transferred to a second-stage foaming device, and then heated with use of steam to further foam the first-stage expanded particles so as to produce second-stage expanded particles having a substantially spherical shape. During this operation, an expanded particle internal pressure and a steam pressure had respective values shown in Table 5 (second-stage foaming condition).

[Preparation of Polypropylene Resin in-Mold Foaming Molded Product]

Next, the second-stage expanded particles produced were fed into a 1-m³ pressure-resistant vessel, and inside of the pressure-resistant vessel was pressurized with air so as to apply to the second-stage expanded particles an internal pressure higher than atmospheric pressure. Then, the second-stage expanded particles filled a mold which molded a box-shaped in-mold foaming molded product having one rib illustrated in FIG. 8. The mold was heated with use of steam so as to fuse the second-stage expanded particles with one another. This operation produced the in-mold foaming molded product. The in-mold foaming molded product was then taken out from the mold. During this operation, an expanded particle internal pressure and a steam pressure had respective values shown in Table 5 (molding condition). The in-mold foaming molded product taken out from the mold was dried and cured for 24 hours in a drier having a temperature of 70° C. Then, evaluation was carried out for surface appearance of a thin wall part (that is the rib) having an external dimension of 50 mm in length, 7 mm in width, and 120 mm in height. Results of the evaluation are shown in Table 5.

Example 30

Preparation of Polypropylene Resin Particles

A mixture was prepared by mixing a polypropylene resin and additives of kinds and amounts shown in Table 5 and 0.01 part by weight of the organic pigment Perylene Red together. The mixture was (i) kneaded in an extruder having a diameter of 50 mm (resin temperature of 210° C.), (ii) extruded from an end of the extruder into a strand shape, and (iii) granulated by cutting the extruded in the strand shape. This produced polypropylene resin particles (1.2 mg per particle).

[Preparation of Expanded Polypropylene Resin Particles]

Into a 10-L pressure-resistant vessel were fed (i) 300 parts by weight of water, (ii) 100 parts by weight of the polypropylene resin particles produced, (iii) 1.2 part by weight of tertiary calcium phosphate serving as a dispersion agent, and (iv) 0.05 part by weight of sodium normal paraffin sulfonate serving as a dispersion auxiliary agent. Further, 15 parts by weight of isobutane was fed into the pressure-resistant vessel. A resulting mixture was, under stirring, retained in the pressure-resistant vessel for 30 minutes at a foaming temperature (temperature inside the vessel) and a foaming pressure (pressure inside the vessel) which are shown in Table 5. Next, while the pressure inside the pressure-resistant vessel was maintained at the foaming pressure with use of nitrogen, an aqueous dispersion was released through an orifice into atmospheric pressure, the orifice having a diameter of 5 mm and being provided at a lower portion of the pressure-resistant vessel. This operation produced first-stage expanded particles having a substantially spherical shape. The first-stage expanded particles were then dried at 75° C. for 24 hours.

[Preparation of Polypropylene Resin in-Mold Foaming Molded Product]

The first-stage expanded particles were fed into a 1-m³ pressure-resistant vessel, and inside of the pressure-resistant vessel was pressurized with air so as to apply to the first-stage expanded particles an internal pressure higher than atmospheric pressure. Then, the first-stage expanded particles filled a mold which molded a box-shaped in-mold foaming molded product having one rib illustrated in FIG. 8. The mold was heated with use of steam so as to fuse the first-stage expanded particles with one another. This operation produced the in-mold foaming molded product. The in-mold foaming molded product was then taken out from the mold. During this operation, an expanded particle internal pressure and a steam pressure had respective values shown in Table 5 (molding condition). The in-mold foaming molded product taken out from the mold was dried and cured for 24 hours in a drier having a temperature of 70° C. Then, evaluation was carried out for surface appearance of a thin wall part (that is the rib) having an external dimension of 50 mm in length, 7 mm in width, and 120 mm in height. A result of the evaluation is shown in Table 5.

TABLE 5

|  |  |  |  | Examples | | Comparative Example |
|---|---|---|---|---|---|---|
|  |  |  |  | 29 | 30 | 10 |
|  | Polypropylene resin A |  | PBW | 100 | 100 | 100 |
|  | Polypropylene resin B |  | PBW |  |  |  |
| Aliphatic diethanolamine fatty acid ester | Stearyl diethanolamine monostearic acid ester |  | PBW | 0.6 | 0.6 |  |
| Aliphatic diethanolamine | Stearyl diethanolamine |  | PBW | 0.4 | 0.4 |  |
|  | Lauryl diethanolamine |  | PBW |  |  |  |
| Aliphatic alcohol | Stearyl alcohol |  | PBW | 0.01 | 0.01 |  |
|  | Lauryl alcohol |  | PBW |  |  |  |
| Other main additives | N-hydroxyethyl-N-[2-hydroxyalkyl]amine |  | PBW |  |  | 1 |
|  | Glycerin stearic acid ester |  | PBW |  |  |  |
| Other additives | Polyethyleneglycol |  | PBW |  |  |  |
|  | Talc |  | PBW | 0.15 | 0.1 | 0.15 |
|  | Melamine |  | PBW |  | 0.15 | 0.15 |
| Expanded polypropylene resin particles | First-stage foaming condition | Carbon dioxide amount | PBW | — | — | — |
|  |  | Isobutane | PBW | — | 15.0 | — |
|  |  | Foaming temperature | ° C. | 150.0 | 136.0 | 150.0 |
|  |  | Foaming P (gage P) | MPa | 2.7 | 2.0 | 2.7 |

TABLE 5-continued

|  |  |  |  | Examples | | Comparative Example |
|---|---|---|---|---|---|---|
|  |  |  |  | 29 | 30 | 10 |
| Polypropylene resin in-mold expanded molded product | First-stage expanded particles | Expanding ratio | times | 12 | 30 | 11 |
|  |  | Bulk density | g/L | 45 | 25 | 47 |
|  |  | DSC Ratio | % | 29 | 25 | 30 |
|  |  | Average particle diameter | mm | 2.9 | 3.7 | 2.8 |
|  | Second-stage foaming condition | EP internal P (absolute P) | MPa | 0.30 | — | 0.30 |
|  |  | Steam P (gage P) | MPa | 0.07 | — | 0.07 |
|  | Second-stage expanded particles | Bulk density | g/L | 28 | — | 29 |
|  |  | Average particle diameter | mm | 3.5 | (3.7) | 3.5 |
|  | Molding conditions | EP internal P (absolute P) | MPa | 0.20 | 0.20 | 0.20 |
|  |  | Steam P (gage P) | MPa | 0.30 | 0.30 | 0.30 |
|  | The number of EPs in shortest distance between surface b of rib and surface facing surface b |  | Number of EPs | 2 | 2 | 2 |
|  | Surface appearance of thin wall part | Convexoconcave of surface | — | G | G | A |
|  |  | Appearance of ridge line | — | G | G | P |

The invention claimed is:

1. An in-mold foaming molded product containing a thin wall part, each of the in-mold foaming molded product and the thin wall part comprising expanded polypropylene resin particles, the expanded polypropylene resin particles including a polypropylene resin composition that contains an aliphatic diethanolamine fatty acid ester and an aliphatic diethanolamine in a total amount of not less than 0.25 parts by weight but not greater than 5 parts by weight with respect to 100 parts by weight of polypropylene resin, wherein a weight proportion of the aliphatic diethanolamine is not less than 0.1 parts by weight but not greater than 3 parts by weight with respect to 100 parts by weight of polypropylene resin, and a weight proportion of the aliphatic diethanolamine fatty acid ester is not less than 0.15 parts by weight but not greater than 2 parts by weight with respect to 100 parts by weight of polypropylene resin.

2. The in-mold foaming molded product as set forth in claim 1, wherein a weight proportion of the aliphatic diethanolamine fatty acid ester is not less than 5 weight % but not greater than 95 weight % with respect to 100 weight % of a total weight of the aliphatic diethanolamine fatty acid ester and the aliphatic diethanolamine.

3. The in-mold foaming molded product as set forth in claim 1, wherein the aliphatic diethanolamine fatty acid ester is a compound represented by General Formula (1), and the aliphatic diethanolamine is a compound represented by General Formula (2),

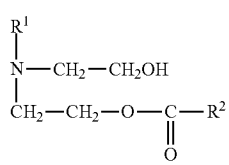

General Formula (1)

where $R^1$ is a C12 to C24 alkyl group, $R^2$ is a C11 to C23 alkyl group, and $R^1$ and $R^2$ are optionally identical to or different from each other,

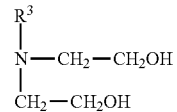

General Formula (2)

where $R^3$ is a C12 to C24 alkyl group.

4. The in-mold foaming molded product as set forth in claim 3, wherein the aliphatic diethanolamine fatty acid ester is stearyl diethanolamine monostearic acid ester, and the aliphatic diethanolamine is stearyl diethanolamine.

5. The in-mold foaming molded product as set forth in claim 1, wherein the polypropylene resin composition further contains an aliphatic alcohol in an amount of not less than 0.001 part by weight but not greater than 2 parts by weight with respect to 100 parts by weight of the polypropylene resin.

6. The in-mold foaming molded product as set forth in claim 5, wherein the aliphatic alcohol is a compound represented by General Formula (3),

General Formula (3)

where $R^4$ is a C12 to C24 alkyl group.

7. The in-mold foaming molded product as set forth in claim 1, wherein a shortest distance between one point of one of a pair of surfaces and the other of the pair of surfaces which face each other on at least one portion of the thin wall part of the in-mold foaming molded product is a distance of not less than one expanded polypropylene resin particle but not more than three expanded polypropylene resin particles.

8. The in-mold foaming molded product as set forth in claim 1, wherein a shortest distance between one point of one of a pair of surfaces and the other of the pair of surfaces which face each other on at least one portion of the thin wall part of the in-mold foaming molded product is a distance of not less than one expanded polypropylene resin particle but not more than two expanded polypropylene resin particles.

9. The in-mold foaming molded product as set forth in claim 1, wherein the in-mold foaming molded product having the thin wall part is configured to house an article in each section partitioned by a rib or ribs which is/are the thin wall part.

10. A method of producing an in-mold foaming molded product having a thin wall part, the method comprising the steps of:

filling a mold with expanded polypropylene resin particles; and heating the expanded polypropylene resin particles in the mold, the expanded polypropylene resin particles including a polypropylene resin composition that contains an aliphatic diethanolamine fatty acid ester and an aliphatic diethanolamine in a total amount of not less than 0.25 parts by weight but not greater than 5 parts by weight with respect to 100 parts by weight of polypropylene resin, wherein a weight proportion of the aliphatic diethanolamine is not less than 0.1 parts by weight but not greater than 3 parts by weight with respect to 100 parts by weight of polypropylene resin, and a weight proportion of the aliphatic diethanolamine fatty acid ester is not less than 0.15 parts by weight but not greater than 2 parts by weight with respect to 100 parts by weight of polypropylene resin.

11. The method as set forth in claim 10, wherein the polypropylene resin composition further contains an aliphatic alcohol in an amount of not less than 0.001 part by weight but not greater than 2 parts by weight with respect to 100 parts by weight of the polypropylene resin.

* * * * *